(12) United States Patent
Grieshaber et al.

(10) Patent No.: US 11,798,763 B2
(45) Date of Patent: Oct. 24, 2023

(54) CURRENT CUT-OFF DEVICE FOR HIGH-VOLTAGE DIRECT CURRENT WITH RESONATOR AND SWITCHING

(71) Applicant: SUPERGRID INSTITUTE, Villeurbanne (FR)

(72) Inventors: Wolfgang Grieshaber, Lyons (FR); Yang Yang, Villeurbanne (FR); Pierre Legendre, Villeurbanne (FR)

(73) Assignee: SUPERGRID INSTITUTE, Villeurbanne (FR)

( * ) Notice: Subject to any disclaimer, the term of this patent is extended or adjusted under 35 U.S.C. 154(b) by 182 days.

(21) Appl. No.: 17/593,617

(22) PCT Filed: Mar. 16, 2020

(86) PCT No.: PCT/HR2020/050552
§ 371 (c)(1),
(2) Date: Sep. 21, 2021

(87) PCT Pub. No.: WO2020/193906
PCT Pub. Date: Oct. 1, 2020

(65) Prior Publication Data
US 2022/0165524 A1 May 26, 2022

(30) Foreign Application Priority Data
Mar. 22, 2019 (FR) ...................... 1903008

(51) Int. Cl.
*H01H 33/59* (2006.01)
*H01H 9/54* (2006.01)
*H02H 9/02* (2006.01)

(52) U.S. Cl.
CPC .......... *H01H 33/596* (2013.01); *H01H 9/542* (2013.01); *H01H 9/547* (2013.01); *H02H 9/026* (2013.01); *H01H 2009/544* (2013.01)

(58) Field of Classification Search
CPC ........ H02H 9/026; H01H 9/542; H01H 9/547; H01H 2009/544; H01H 2009/543; H01H 33/596
See application file for complete search history.

(56) References Cited

U.S. PATENT DOCUMENTS 3,758,790 A 9/1973 Kind et al.
3,777,178 A 12/1973 Gratzmuller
(Continued)

FOREIGN PATENT DOCUMENTS

CN 103219699 A 7/2013
CN 103296636 A 9/2013
(Continued)

OTHER PUBLICATIONS

International Search Report with Written Opinion from PCT Application No. PCT/FR2020/050552, dated Jul. 16, 2020.
(Continued)

*Primary Examiner* — Bryan R Perez
(74) *Attorney, Agent, or Firm* — WORKMAN NYDEGGER

(57) ABSTRACT

A current cut-off device for high-voltage DC current includes: between a primary point and an intermediate point, a primary diversion member and, in parallel, a primary surge protector; a secondary mechanical switch between the intermediate point and the secondary point; a main resonator whose terminal is linked to the secondary point; a main oscillation switch; a main surge protector, in parallel with a main capacitance of the main resonator; wherein the main oscillation switch includes three terminals linked respectively to the primary point, to the intermediate point and to the other terminal of the main resonator; the changeover switch can switch at least between three direct, inverting and isolated states.

20 Claims, 8 Drawing Sheets

(56) References Cited

U.S. PATENT DOCUMENTS

| | | | |
|---|---|---|---|
| 4,442,469 A | 4/1984 | Yanabu et al. |
| 4,488,021 A | 12/1984 | Yoshizumi |
| 4,578,730 A | 3/1986 | Tokuyama et al. |
| 4,618,905 A | 10/1986 | Tokuyama et al. |
| 5,121,281 A | 6/1992 | Pham et al. |
| 5,225,642 A | 7/1993 | Yamamoto et al. |
| 5,235,147 A | 8/1993 | Pham et al. |
| 5,266,758 A | 11/1993 | Pham et al. |
| 5,517,378 A | 5/1996 | Asplund et al. |
| 5,517,578 A | 5/1996 | Altman et al. |
| 5,629,658 A | 5/1997 | Chen |
| 5,828,176 A | 10/1998 | Goebel |
| 8,683,330 B2 | 3/2014 | Katoh |
| 9,373,473 B2 | 6/2016 | Dupraz et al. |
| 9,640,973 B2 | 5/2017 | Rong et al. |
| 9,875,861 B2 | 1/2018 | Ergin et al. |
| 10,256,067 B1 | 4/2019 | Sommerer et al. |
| 10,468,873 B2 | 11/2019 | Luscan et al. |
| 10,475,600 B2 | 11/2019 | Berard et al. |
| 2012/0299393 A1 | 11/2012 | Haefner et al. |
| 2012/0327460 A1 | 12/2012 | Katoh |
| 2013/0070492 A1 | 3/2013 | Skarby |
| 2014/0005053 A1 | 1/2014 | Schacherer et al. |
| 2014/0217833 A1 | 8/2014 | Rong et al. |
| 2014/0299579 A1 | 10/2014 | Hartmann et al. |
| 2014/0313628 A1 | 10/2014 | Häfner et al. |
| 2015/0002977 A1 | 1/2015 | Dupraz et al. |
| 2016/0028222 A1 | 1/2016 | Johansson |
| 2016/0285250 A1 | 9/2016 | Lee et al. |
| 2016/0300671 A1 | 10/2016 | Ergin et al. |
| 2016/0322177 A1 | 11/2016 | Hwang et al. |
| 2016/0329179 A1 | 11/2016 | Kim et al. |
| 2017/0178832 A1 | 6/2017 | Berard et al. |
| 2017/0178844 A1 | 6/2017 | Ängquist et al. |
| 2017/0271100 A1 | 9/2017 | Ka et al. |
| 2017/0365998 A1 | 12/2017 | Uscan et al. |
| 2018/0019583 A1 | 1/2018 | Dupraz et al. |
| 2018/0041021 A1 | 2/2018 | Backman et al. |
| 2018/0138695 A1 | 5/2018 | Wu et al. |
| 2018/0233309 A1 | 8/2018 | Gery et al. |
| 2019/0013662 A1 | 1/2019 | Norrga et al. |
| 2019/0295801 A1 | 9/2019 | Sommerer et al. |
| 2019/0355534 A1 | 11/2019 | Gery et al. |
| 2020/0006933 A1 | 1/2020 | Egendre et al. |
| 2020/0373921 A1 | 11/2020 | Davidson |
| 2021/0082643 A1 | 3/2021 | Davidson |

FOREIGN PATENT DOCUMENTS

| | | | |
|---|---|---|---|
| CN | 103346541 A | 10/2013 | |
| CN | 103403830 A | 11/2013 | |
| CN | 103618298 A | 3/2014 | |
| CN | 103779828 A | 5/2014 | |
| DE | 2136865 B1 | 12/1972 | |
| DE | 102011083514 A1 | 3/2013 | |
| EP | 0384346 A1 | 8/1990 | |
| EP | 0431510 A1 | 6/1991 | |
| EP | 0660352 A1 | 6/1995 | |
| EP | 2978005 A1 | 1/2016 | |
| EP | 3059827 A1 | 8/2016 | |
| EP | 3089301 A1 | 11/2016 | |
| EP | 3091626 A1 | 11/2016 | |
| EP | 3161846 A1 | 5/2017 | |
| EP | 3306635 A1 | 4/2018 | |
| EP | 3321948 A1 | 5/2018 | |
| EP | 3522194 A1 | 8/2019 | |
| EP | 3522196 A1 | 8/2019 | |
| FR | 2154929 A5 | 5/1973 | |
| FR | 2668648 A1 | 4/1992 | |
| FR | 2674984 A1 | 10/1992 | |
| JP | S4874320 A | 10/1973 | |
| JP | S61161018 A | 7/1986 | |
| JP | 102191042 A | 7/1990 | |
| JP | 2013004010 A | 1/2013 | |
| WO | 2011057675 A1 | 5/2011 | |
| WO | 2012100831 A1 | 8/2012 | |
| WO | 2013092873 A1 | 6/2013 | |
| WO | 2014166528 A1 | 10/2014 | |
| WO | 2015078525 A1 | 6/2015 | |
| WO | 2015103857 A1 | 7/2015 | |
| WO | 2015166600 A1 | 11/2015 | |
| WO | 2015185096 A1 | 12/2015 | |
| WO | 2016092182 A1 | 6/2016 | |
| WO | WO-2016096016 A1 * | 6/2016 | ........... H01H 33/596 |
| WO | 2017103355 A1 | 6/2017 | |
| WO | 2017116296 A1 | 7/2017 | |
| WO | 2018162421 A1 | 9/2018 | |
| WO | 2019077269 A1 | 4/2019 | |
| WO | 2020136340 A1 | 7/2020 | |
| WO | 2020136350 A1 | 7/2020 | |
| WO | 2020147572 A1 | 7/2020 | |

OTHER PUBLICATIONS

"High Voltage Surge Arresters Buyer's Guide", Document ID 1HSM 9543 12-00en, ABB High Voltage Surge Arresters, Buyer's Guide, Edition 14, May 1, 2018, 127 pages.

Bonin et al., "A Method of Current Interruption in HVDC Networks by Means of AC Circuit-Breakers with Adapted ARC Characteristics and Energy Absorbers," International Conference on Large High Tension Electric Systems, Aug. 24-Sep. 2, 1970, 15 pages.

Tokuyama et al., "Development and Interrupting Tests on 250KV 8KA HVDC Circuit Breaker," IEEE Transactions n Power Apparatus and Systems, vol. PAS-104, No. 9, Sep. 1, 1985, pp. 2453-2459.

Tahata et al. "HVDC Circuit Breakers for HVDC Grid Applications", 11th IET International Conference on AC and DC Power Transmission, Feb. 10-12, 2015, pp. 1-9.

Negari, "A New Design of Solid State Circuit Breaker for HVDC Applications," Doctoral Dissertation, Ryerson University, Jan. 1, 2015, 101 pages.

"Surge Protection Devices (SPD) Electrical Installation Guide," Schneider Electric, Jan. 1, 2015, 14 pages.

Xiang et al., "DC Circuit Breaker Using Superconductor for Current Limiting," IEEE Transactions on Applied Superconductivity vol. 25, Issue No. 2, Oct. 14, 2014, pp. 1-7.

Vinothkumar et al., "Sequential Auto-Reclosing Method for Hybrid HVDC Breaker in VSC HVDC Links", 2016 IEEE 2nd Annual Southern Power Electronics Conference (SPEC), Dec. 5, 2016, pp. 1-6.

Ebner et al., "Fault Arc Extinction and System Restart on HVDC Transmission Lines Using LCC or VSC Full Bridge Converters with Integrated Arc Recovery Simulation Models," 13th IET International Conference on AC and DC Power Transmission (ACDC 2017), Feb. 14, 2017, pp. 1-5.

Zhang et al., "A Novel Low Voltage Hybrid DC Switch Using Resonant Current Injection," International Conference on Components and Systems for DC Grids, Mar. 14-15, 2017, pp. 1-6.

Pathmanathan et al., "Self Powered Supply and Control System for Hybrid Semiconductor DC Switch," 2018 20th European Conference on Power Electronics and Applications (EPE'18 ECCE Europe), Sep. 17, 2018, pp. pp. 1-10.

Shu et al., "A Soft Reclosing Model for Hybrid DC Circuit Breaker in VSC MTDC System," 2018 IEEE 4th Southern Power Electronics Conference, Dec. 10-13, 2018, pp. 1-5.

Yang et al., "An Adaptive Reclosing Strategy for MMC-HVDC Systems with Hybrid DC Circuit Breakers," IEEE Transactions on Power Delivery, vol. 35, Issue No. 3, Aug. 19, 2019, pp. 1111-1123.

Zhang et al., "Fault Property Identification Method and Application for MTDC Grids with Hybrid DC Circuit Breaker", Electrical Power and Energy Systems, vol. 110, Mar. 8, 2019, pp. 136-143.

Hinrichsen, "Metal-Oxide Surge Arresters in High-Voltage Power Systems," Siemens AG, 3rd Edition, Jan. 1, 2021, 124 pages.

Search Report from corresponding French Application No. FR1903008, dated Oct. 24, 2019.

* cited by examiner

[Fig. 1]
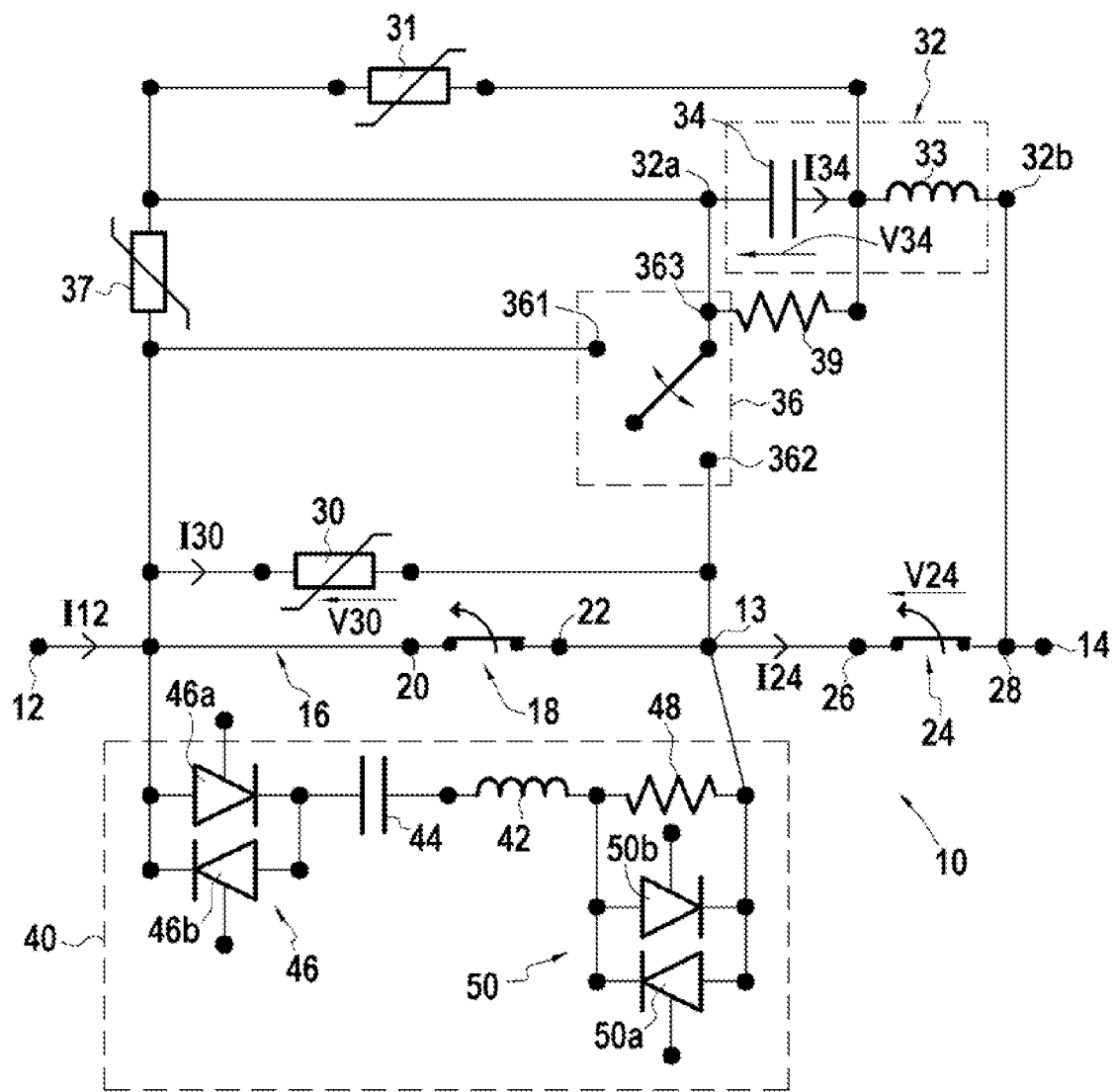

[Fig. 2]
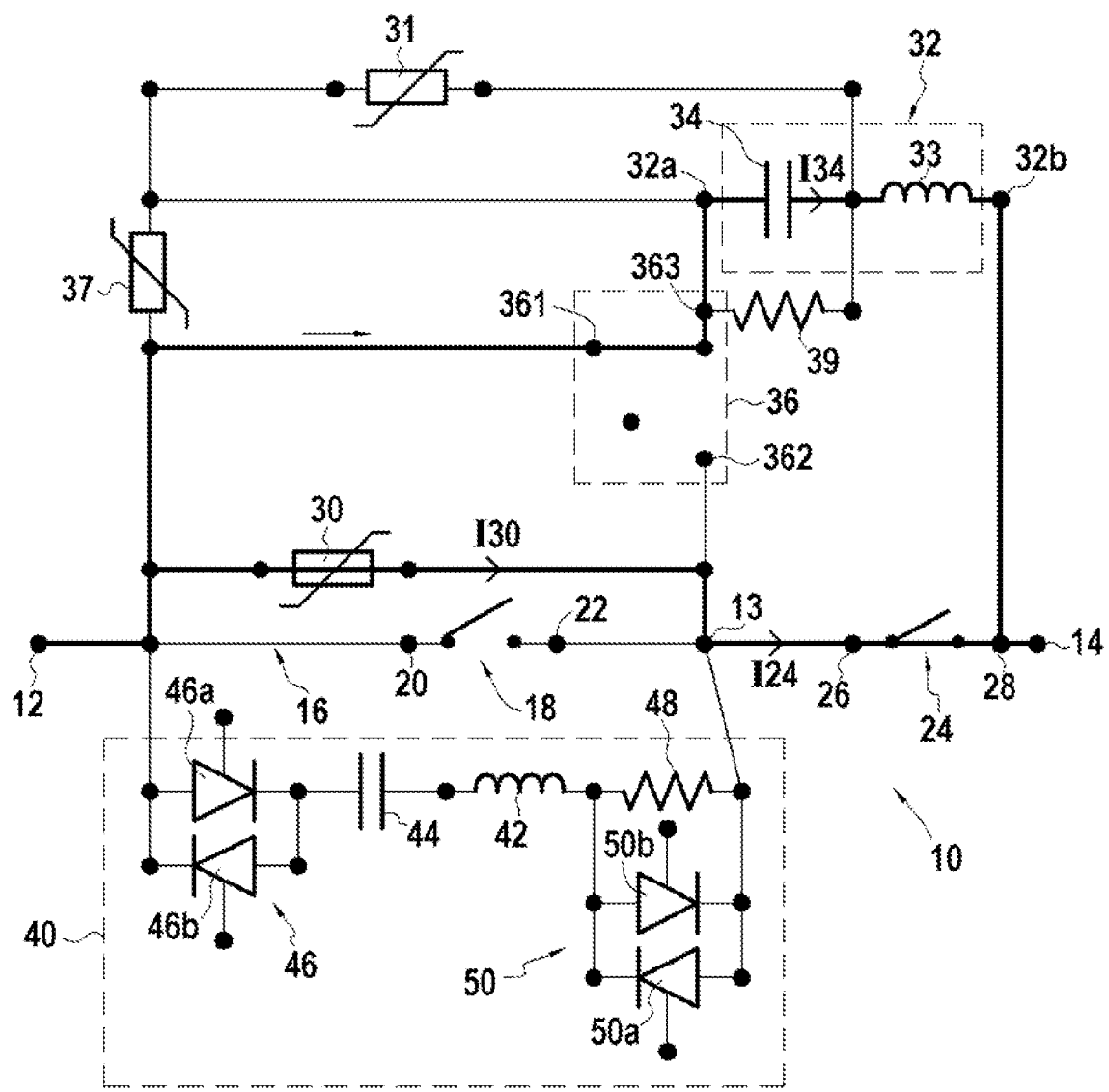

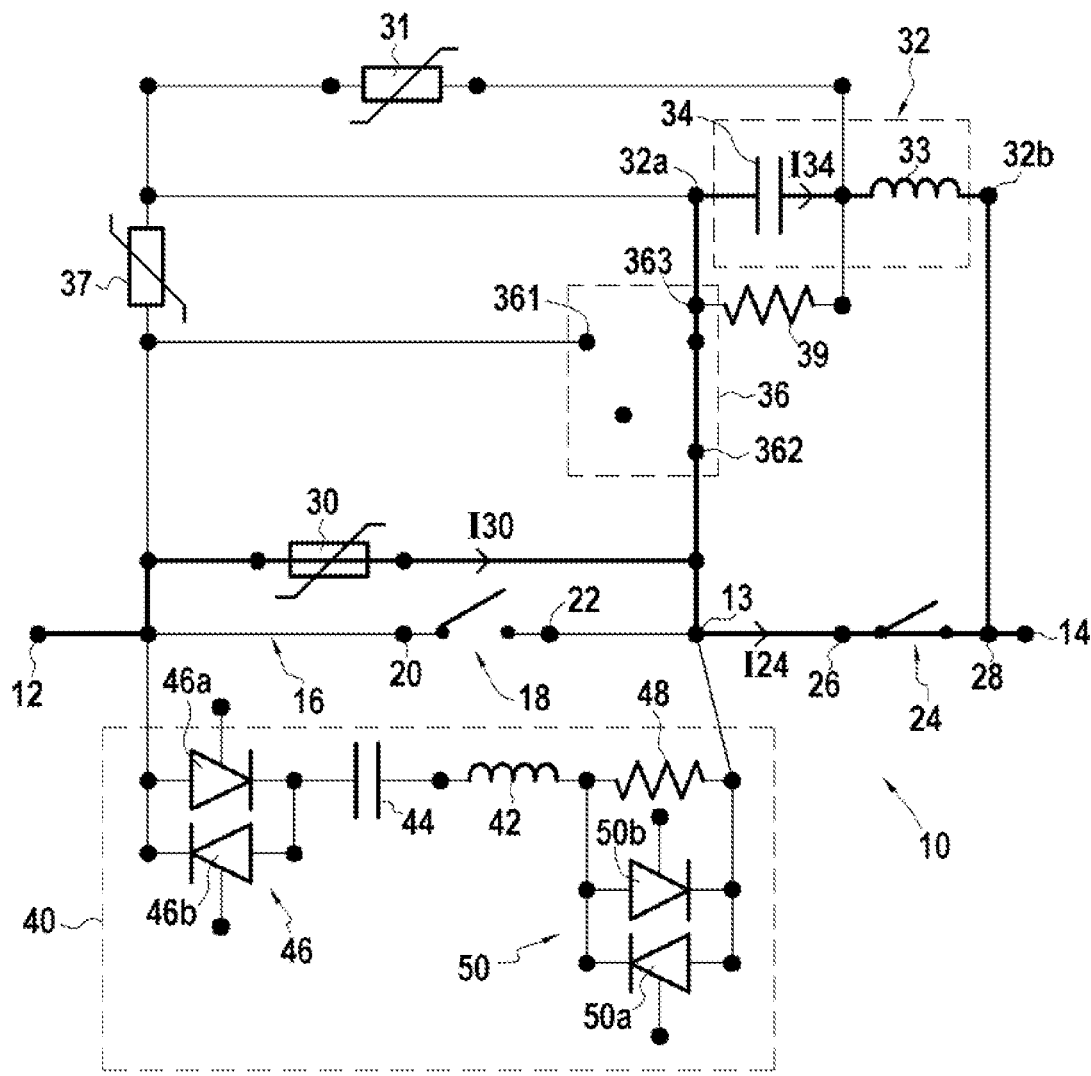
[Fig. 3]

[Fig. 4]
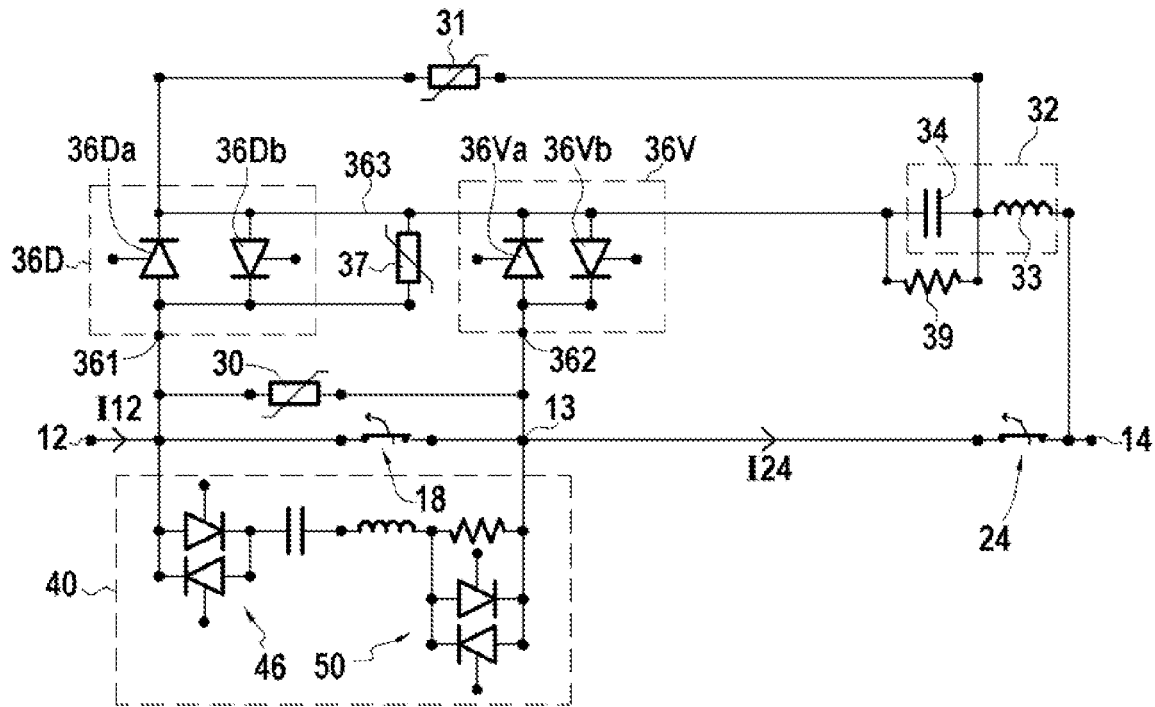
[Fig. 5]
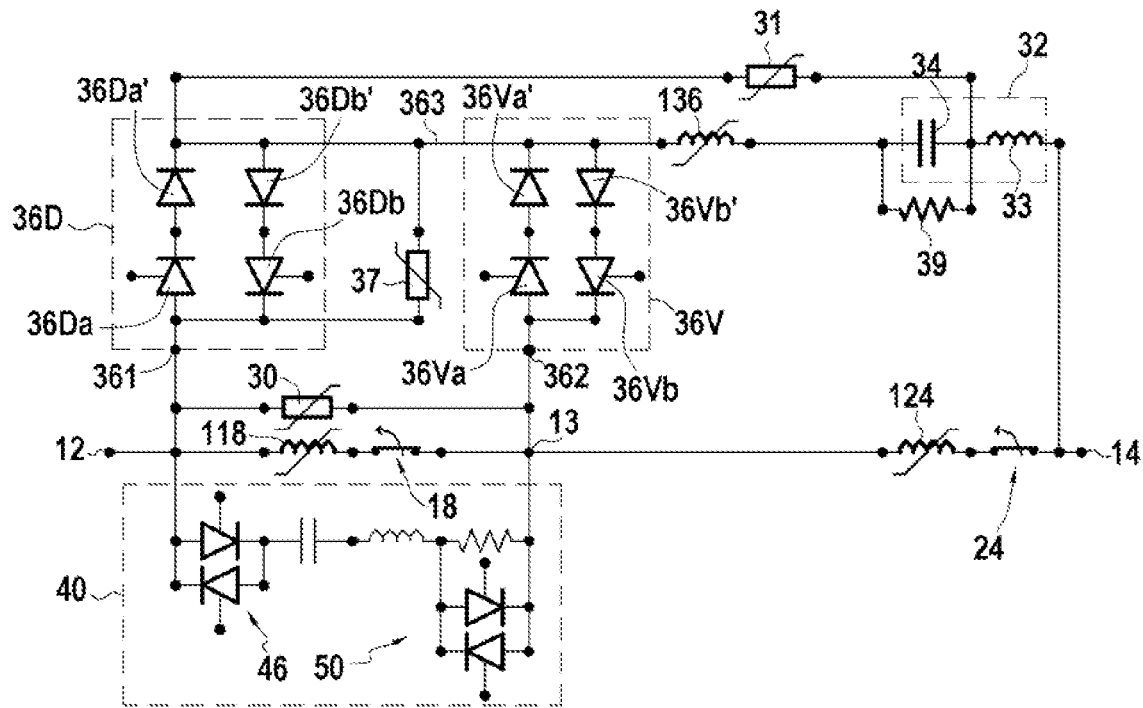

[Fig. 6]
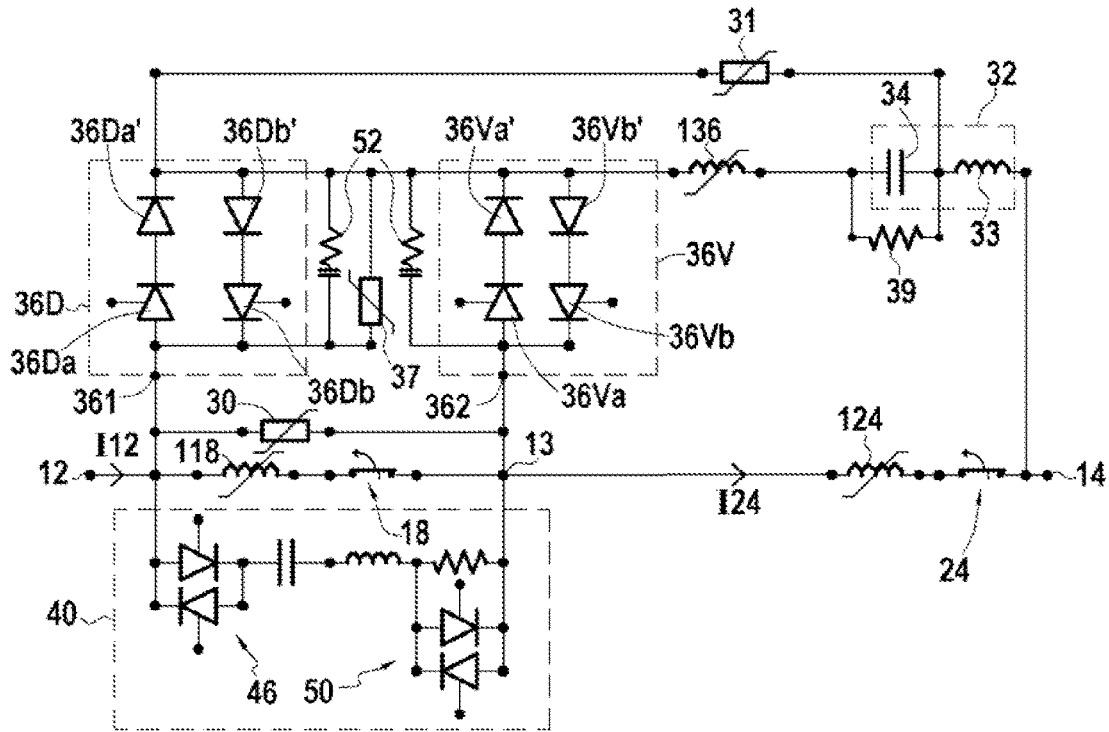
[Fig. 7]
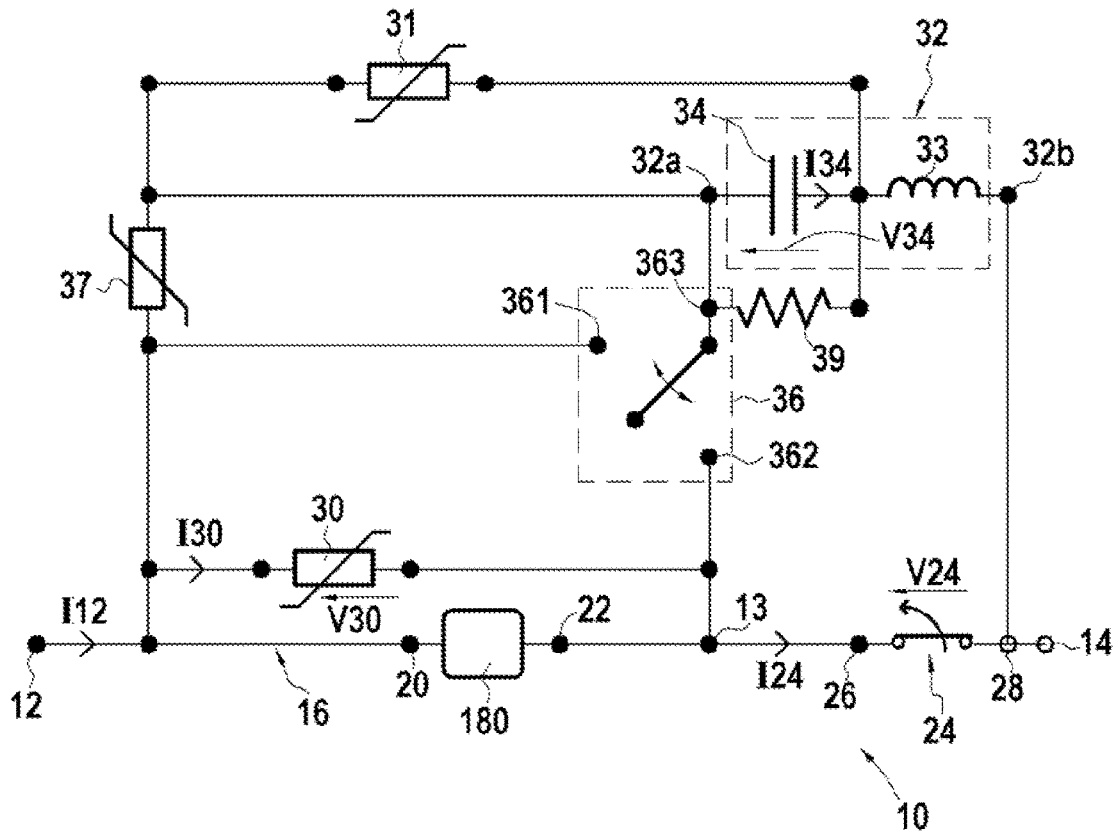

[Fig. 8]
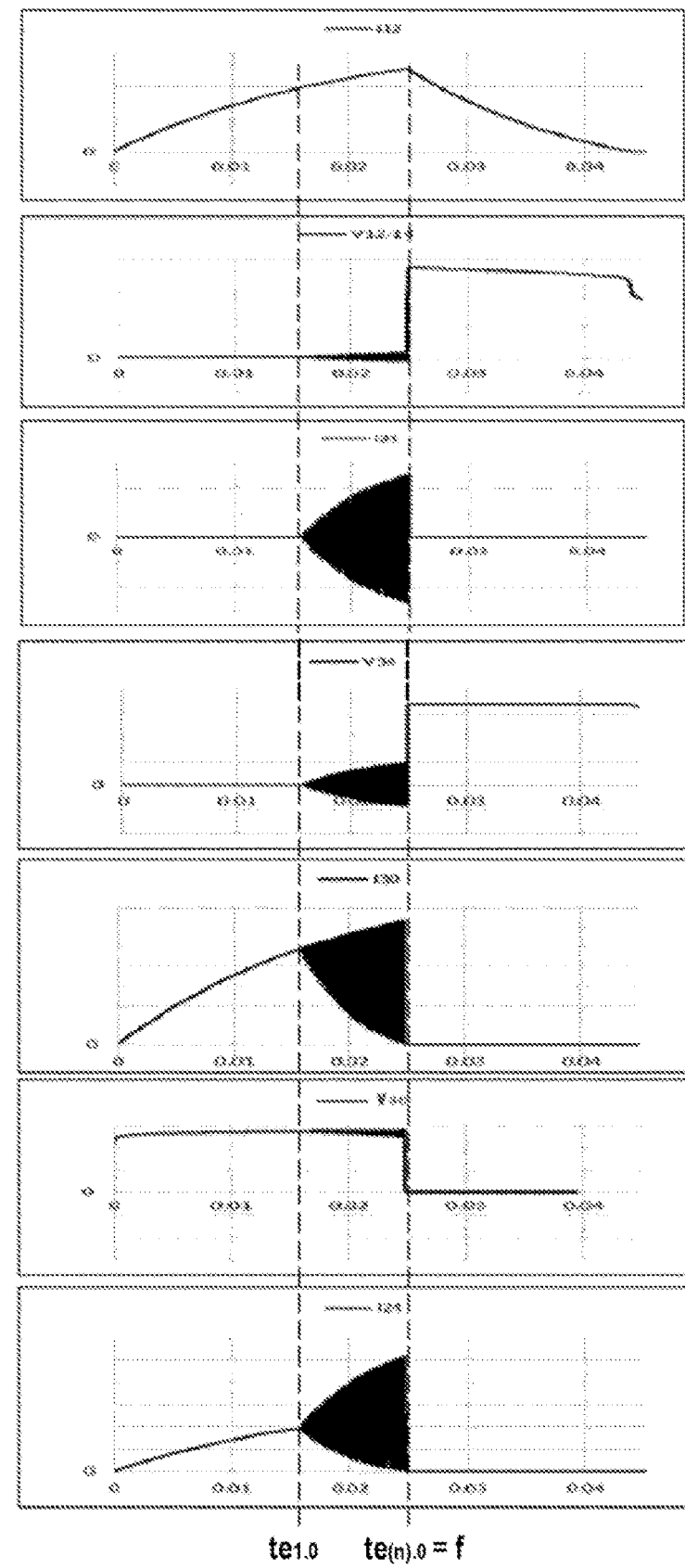

[Fig. 9]
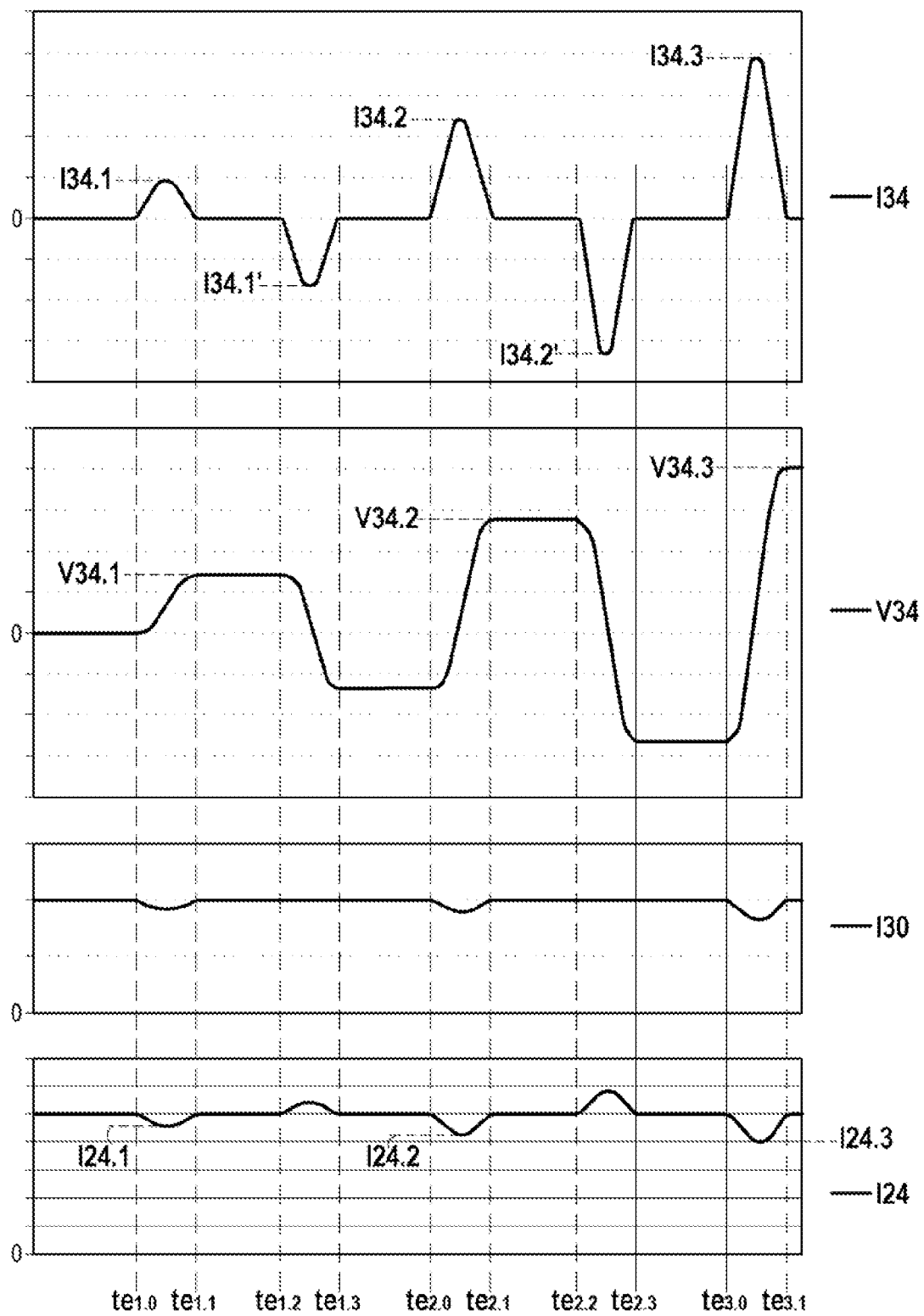

[Fig. 10]
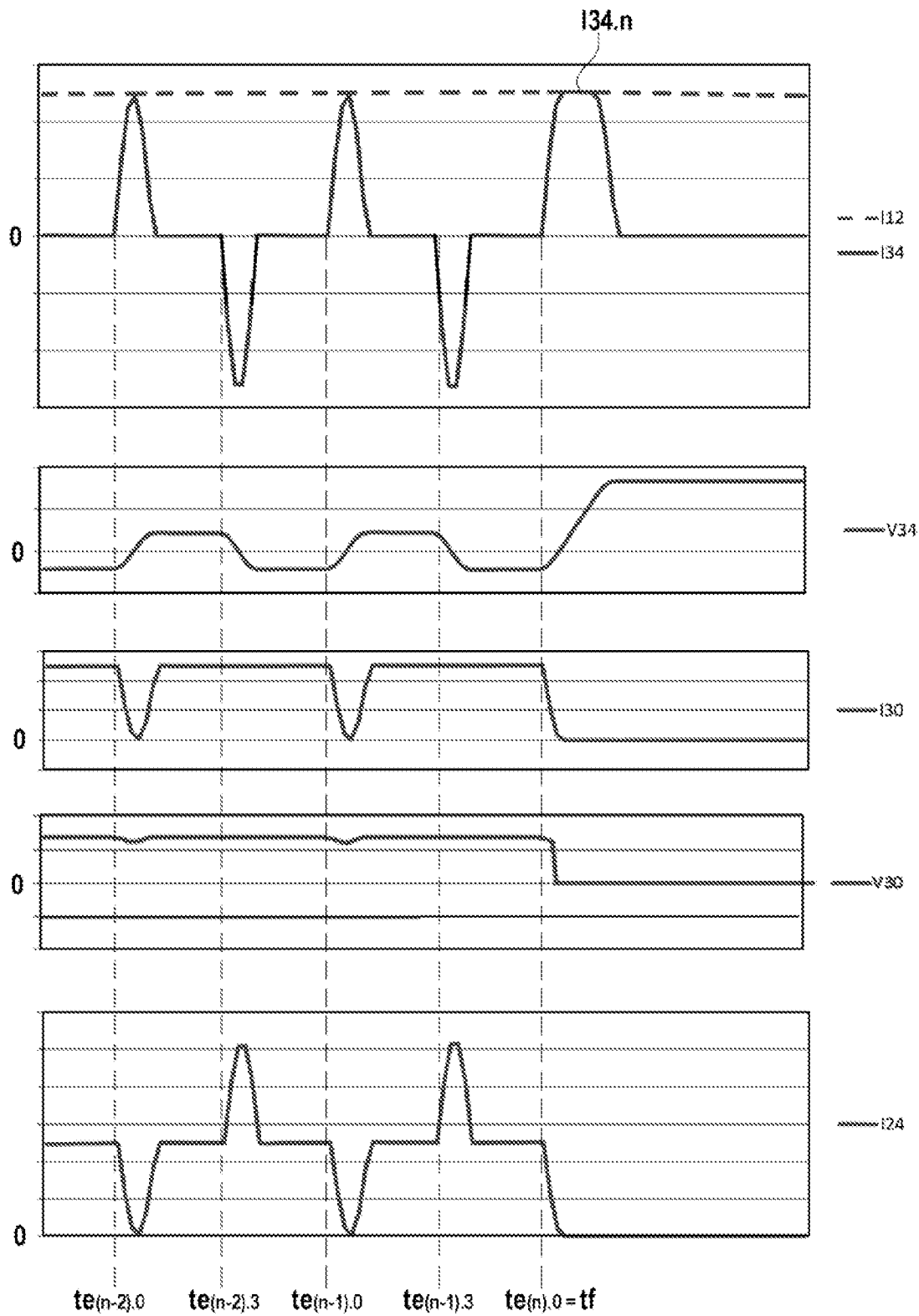

US 11,798,763 B2

CURRENT CUT-OFF DEVICE FOR HIGH-VOLTAGE DIRECT CURRENT WITH RESONATOR AND SWITCHING

TECHNIQUE FIELD

The invention relates to the field of high-voltage DC current transmission and/or distribution networks, generally known as HVDC networks. The invention relates particularly to fault current cut-off devices intended for such networks.

HVDC networks are in particular envisaged as a solution to the interconnection of disparate or non-synchronous electricity production sites. The HVDC networks are in particular envisaged for the transmission and the distribution of energy produced by offshore wind farms rather than AC current technologies, due to lower line losses and to absence of impact of the stray capacitances of the network on long distances. Such networks have typically voltage levels on the order of 100 kV and more.

In the present text, for a device in which a DC current circulates, is considered as a high-voltage device: either a "high voltage A" device in which the nominal operating voltage is greater than 1,500 V in DC current but less than or equal to 75,000 V (75 kV), or a "high voltage B" device when the nominal operating voltage is greater than 75,000 V (75 kV) in DC current. Thus, the range of the high voltage includes the field of the "high voltage A" and that of the "high voltage B".

The cut-off of the DC current in such networks is a crucial issue directly conditioning the feasibility and development of such networks.

Cut-off apparatuses of the mechanical circuit-breaker type are known to achieve the cut-off of the AC current, that is to say the cut-off of the current is obtained only by the opening of a mechanical switch element. Such a mechanical switch element includes two conductive parts making contact which are in mechanical and electrical contact when the switch element is closed and which separate mechanically when the switch element is open. These mechanical circuit-breakers have several drawbacks when they are traversed by high currents.

In the presence of a current and/or of a significant voltage, the mechanical separation can result in the establishment of an electric arc between the two conductive parts, because of the significant energies accumulated in the network that the apparatus protects. As long as the electric arc remains established through the mechanical separation, the cut-off apparatus does not achieve the electrical cut-off since a current continues to flow through the apparatus due to the presence of the arc. The electrical cut-off, in the sense of the effective interruption of the flow of the electric current, is sometimes particularly difficult to achieve in a DC current and high voltage context, these conditions tending to maintain the electric arc. Moreover, this electric arc degrades on the one hand, by erosion, the two conductive parts making contact and on the other hand, by ionization, the surrounding environment. In addition, the current takes a certain time to be interrupted because of this ionization. This requires maintenance operations on the cut-off apparatus which are burdensome and expensive.

Fault currents in a HVDC network are particularly violent and destructive. When a fault generating a high current appears, it is necessary to cut it off quickly or possibly to limit it while waiting for the cut-off to be possible. In addition, the cut-off of the HVDC currents is more complex to achieve than that of the AC currents (AC). Indeed, during the cut-off of an AC current, a zero crossing of the current is exploited to achieve the cut-off, which is not the case with a DC current, in particular a HVDC current.

PRIOR ART

Various solutions have been proposed to facilitate the current cut-off in an HVDC line. For example, documents DE-10.2011.083514, WO-2015/078525, WO-2015/166600, US-2017/0178844, or DE-2136865, WO-2015/185096, U.S. Pat. Nos. 4,442,469, 3,758,790 can be mentioned.

Some solutions use many active semiconductor changeover components, mainly thyristors and IGBTs. However, these components have a high price/power ratio. An excessive use of such semiconductor changeover switches increases the cost of the solution.

Document EP-3.161.846 describes a current cut-off device for high-voltage DC current including a primary switch and an oscillation circuit having a series LC-type resonator, and which is electrically arranged in parallel with the primary switch. This oscillation circuit is supplied by a converter with controlled changeover switches. This oscillation circuit is susceptible to generate an oscillation current whose peak intensity increases as the oscillations progress, so as to create, when the peak intensity of the oscillation current reaches a value greater than the initial current in the primary switch, a zero crossing of the current in the primary switch. The IGBT converter which is implemented is relatively complex, and requires perfect monitoring of the changeover time points of the controlled changeover switches. Document WO-2017/116296 describes variants of the same concept, affected by the same problems.

Furthermore, in a separate low voltage field, for a nominal voltage less than or equal to 1 kV, systems have been proposed including an LC-type resonator and a changeover member to generate an oscillation current whose peak intensity increases as the oscillations progress. Such a system is described for example in "A novel low voltage hybrid DC switch using resonant current injection", Zichi Zhang et al., International Conference on Components and Systems for DC Grids, March 2017, and in "Self-powered supply and control system for hybrid semiconductor DC switch", Mehanathan Pathmanathan et al., EPE'18 ECCE Europe, ISBN: 9789075815290—IEEE catalog number: CFP18850—USB. Document EP-3.059.827 describes a comparable system for low or medium voltage applications.

Document EP-0.660.352 describes a current cut-off device for high-voltage DC current. This device comprises a primary mechanical switch and a secondary mechanical switch interposed successively in the main line between the primary point and the secondary point but on either side of an intermediate point of the main line, the two mechanical switches each being controlled between an open state and a closed state. The device comprises a primary surge protector arranged in parallel with the primary switch between the primary point and the intermediate point. This device further includes an oscillation circuit having a resonator, which is here of the series LC type, and which is arranged electrically in parallel with the assembly formed by the primary switch and the secondary switch. The oscillation circuit further includes an excitation switch, in the form of an IGBT in parallel with the primary switch which is open and closed at an oscillation frequency. This oscillation circuit is susceptible to generate an oscillation current whose peak intensity increases as the oscillations progress, so as to create, when the peak intensity of the oscillation current reaches a value greater than the initial current in the main line, a zero crossing of the current in the main line, therefore through two switches. This device further includes a main surge protector, arranged electrically in parallel with the LC-type resonator of the oscillation circuit. In this device, the excitation switch must be dimensioned to withstand twice the fault current, which considerably increases the price. In addition, this device is only capable of stopping a fault current in only one direction through the main line. Finally, the changeover losses in the excitation switch are very significant.

In summary, compared to the prior art, the invention aims to offer solutions that have a current interrupting capacity that can cut off currents of the order of several tens of kiloamperes, for example 20 kiloamperes, with a reasonable size and cost.

DISCLOSURE OF THE INVENTION

The invention therefore proposes a current cut-off device for high-voltage DC current, of the type including:
- a main line between a primary point and a secondary point, with an intermediate point in the main line between the primary point and the secondary point;
- a primary diversion member interposed in the main line between the primary point and the intermediate point, the diversion member having at least an on-state, in which it conducts an electric current between the primary point and the intermediate point, and at least a diversion state, in which it opposes at least partly a passage of an electric current between the primary point and the intermediate point;
- a primary surge protector electrically arranged in parallel with the primary diversion member, between the primary point and the intermediate point;
- a secondary mechanical switch interposed in the main line between the intermediate point and the secondary point, the secondary switch having an open state and a closed state;
- a main resonator including at least a main inductance and a main capacitance electrically in series between a first terminal and a second terminal of the main resonator, the second terminal being electrically linked to the secondary point of the main line,
- a main oscillation switch;
- a main surge protector, electrically arranged in parallel at least with the main capacitance of the resonator.

Such a device is characterized in that the main oscillation switch includes a three-terminal changeover switch comprising:
- a direct terminal electrically linked to the primary point of the main line;
- an inverting terminal electrically linked to the intermediate point of the main line;
- an output terminal electrically linked to the first terminal of the resonator; and able to switch at least between the three following states:
- a direct state in which the output terminal is only linked to the direct terminal;
- an inverting state in which the output terminal is only linked to the inverting terminal; and
- an isolated state in which the output terminal is electrically isolated from the direct terminal and from the inverting terminal.

Other optional characteristics of such a device, taken alone or in combination, are listed below.

The changeover switch may be bidirectional.

The changeover switch may be an electronic semiconductor changeover switch.

The changeover switch may include a switch, which will be called direct switch, between the direct terminal and the output terminal and a switch, which will be called reversing switch, between the inverting terminal and the output terminal, with at most only one of the two direct and reversing switches which is in a closed state at a given time point.

The direct switch and the reversing switch may be bidirectional switches.

The direct switch and the reversing switch may be electronic semiconductor switches.

The direct switch and/or of the reversing switch may include two thyristors mounted head-to-tail, each in one of two branches electrically in parallel.

Each of the two thyristors may be associated electrically in series, in its branch, with a diode.

The primary diversion member may be a switch, the on-state corresponding to a closed state of the switch and the diversion state corresponding to an open state of the switch. The diversion member may be in particular a mechanical switch. In these two cases, the primary switch and the secondary switch are interposed successively in the main line between the primary point and the secondary point, on either side of the intermediate point of the main line, and are each able to be independently controlled between their open state and their closed state.

The device may include an auxiliary oscillation circuit arranged electrically in parallel with the primary switch between the primary point and the intermediate point, the auxiliary oscillation circuit including at least an auxiliary inductance, an auxiliary capacitance and an auxiliary oscillation trigger electrically in series.

The device may include, in the auxiliary oscillation circuit, a pilotable device allowing varying the resistance value inserted in series in the auxiliary oscillation circuit.

The pilotable device may include at least one damping resistance and at least one bypass switch of the damping resistance, the bypass switch being susceptible to switch between an open state and a closed state, the damping resistance and the bypass switch being arranged such that, in a state of the bypass switch, the damping resistance is electrically in series in the auxiliary oscillation circuit with the auxiliary inductance, the auxiliary capacitance and the auxiliary oscillation trigger, while in the other state of the bypass switch the damping resistance is short-circuited relative to the auxiliary oscillation circuit.

The primary switch may be a "high voltage A" switch and the secondary switch may be a "high voltage B" switch.

The primary switch may be a vacuum switch and the secondary switch may be an isolating gas switch.

The primary diversion member may comprise or may be a current limiter. The current limiter may then be configured to oppose an electrical resistance to any current passing therethrough whose intensity exceeds a value called threshold intensity.

The current limiter may be of the superconducting resistance type.

The device may include a surge protector electrically arranged between the primary point and the first terminal of the main resonator or between the intermediate point and the first terminal of the main resonator.

The invention also relates to a method for piloting a cut-off device as described above, characterized in that it includes the steps of:
switching the primary diversion member to its diversion state;

mechanically opening the secondary switch;

repeatedly switching the three-terminal changeover switch between its direct and inverting states, by passing at each alternation through the isolated state.

In such a piloting method, the switching of the three-terminal changeover switch is stopped as soon as the current in the secondary switch is zero or as soon as the voltage across the primary surge protector is zero.

The method may include the step of cutting off the current in the primary diversion member designed as a mechanical primary switch, after its mechanical opening, to cause the appearance, across the primary surge protector, of a voltage greater than the transition voltage of the primary surge protector.

BRIEF DESCRIPTION OF THE DRAWINGS

FIG. 1 is a schematic view of a first embodiment of a cut-off device according to the invention.

FIG. 2 illustrates the device of FIG. 1, in a direct state of its changeover switch.

FIG. 3 illustrates the device of FIG. 1, in an inverting state of its changeover switch.

FIG. 4 is a schematic view of a second embodiment of a cut-off device according to the invention.

FIG. 5 is a schematic view of a third embodiment of a cut-off device according to the invention.

FIG. 6 is a schematic view of a fourth embodiment of a cut-off device according to the invention.

FIG. 7 is a schematic view of a fifth embodiment of a cut-off device according to the invention.

FIG. 8 is a graph schematically illustrating the variations of some of the operating characteristic parameters of a device according to the fourth embodiment of the invention illustrated in FIG. 6, during an opening process.

FIG. 9 is a graph schematically illustrating the variations of some of the operating characteristic parameters of a device according to the invention, during an opening process, in an initial phase of the changeover of the changeover switch.

FIG. 10 is a graph schematically illustrating the variations of some of the operating characteristic parameters of a device according to the invention, during an opening process, in a final phase of the changeover of the changeover switch.

DESCRIPTION OF THE EMBODIMENTS

FIG. 1 is a schematic representation of a first embodiment of a cut-off device 10 according to the invention, for a "high voltage A" DC current, or preferably "high voltage B" DC current. FIGS. 2 and 3 illustrate more particularly this device respectively in a direct state and in an inverting state of its switch, as explained below.

FIGS. 4 to 7 represent variants of the invention.

As can be seen in FIGS. 1 to 7, the current cut-off device 10 includes a primary point, which may be a first terminal 12, and a secondary point, which may be a second terminal 14. This primary point 12 and this secondary point 14, or terminals, form inputs/outputs for the current in the device 10. Each of these points can correspond to a physical terminal of the device 10, for example a physical connection terminal, or a virtual terminal of the device 10 as being a point along a conductor.

The device 10 includes an electrically conductive main line 16 which extends between the first terminal 12 and the second terminal 14, with an intermediate point 13 in the main line between the primary point 12 and the secondary point 14.

A primary diversion member is interposed in the main line between the primary point 12 and the intermediate point 13. This primary diversion member, which will be seen later that it can include a primary switch 18 or that it can include a current limiter 180, has at least an on-state, in which it conducts an electric current between the primary point and the intermediate point, preferably with zero or negligible electrical resistance, and at least a diversion state, in which it opposes at least partly a passage of an electric current between the primary point and the intermediate point, for example preferably with a non-negligible, even very large, electrical resistance that can even be considered as infinite in the case of a switch.

In the embodiments of FIGS. 1 to 6, the primary diversion member is designed as a primary switch 18. The on-state of the primary diversion member then corresponding to the closed state of the primary switch 18, and the diversion state of the primary diversion member corresponding to the open state of the primary switch 18. In the embodiment of FIG. 7, the primary diversion member is designed as a current limiter 180.

In all the embodiments, the cut-off device 10 includes a secondary mechanical switch 24 interposed in the main line between the intermediate point 13 and the secondary point 14. The secondary switch 24 is susceptible to be in one of at least two states, namely an open state or a closed state.

In the embodiments of FIGS. 1 to 6, there is thus, interposed successively in the main line between the primary point 12 and the secondary point 14, the primary diversion member as a primary switch 18, having a first terminal 20 and a second terminal 22, and the secondary switch 24, also having a first terminal 26 and a second terminal 28. The first terminal 20 of the primary switch 18, or more generally of the primary diversion member, is at the same electric potential as the point primary 12. The second terminal 28 of the secondary switch 24 is at the same electric potential as the secondary point 14. The second terminal 22 of the primary switch 18, or more generally of the primary diversion member, and the first terminal 28 of the secondary switch 24 are at the same electric potential, and at the same electric potential as an intermediate point 13 of the main line 16. The intermediate point 13 is arranged between the two switches 18, 24, or more generally between the primary diversion member and the secondary switch 24. When the primary switch 18, or more generally the primary diversion member, and the secondary switch 24 are in an on-state or closed state, letting the electric current through, the latter flows, through the device 10, in the main line 16, which is then the line of lowest impedance of the device 10 between the primary point 12 and the secondary point 14. Either of the primary switch 18 and of the secondary switch 24, or both, can be switched in an open state or in a closed state.

The device 10 is intended to be integrated into an electrical installation. For example, the first terminal 12 of the device 10 can be linked to a portion of the installation that can comprise a high-voltage source, for example a "high voltage B" source, in particular greater than 100 kilovolts. The second terminal 14 can for example be linked to a current consuming circuit, for example an electrical charge or an electrical network. In this way, it can be considered that, in the example illustrated, the first terminal 12 is an upstream terminal, or current input terminal, while the second terminal 14 is a downstream terminal, or current output terminal, in the direction of flow of the current. Thus, in this example, the main line 16 of the device would be intended to be traversed by the nominal current provided by the DC voltage source. However, the device 10 according to the invention, in the illustrated embodiments, is reversible, so that a flow of the current through the device could be provided in the reverse direction.

The electrical installation is provided to operate at a nominal DC voltage, in the high-voltage field, therefore at least greater than 1,500 Volts, preferably in the "high voltage B" field, therefore greater than 75,000 Volts, in particular greater than 100,000 Volts. The invention will find in particular an advantageous application for a cut-off device having the capacity to cut off a current ranging up to 3,000 Amperes, preferably up to 10,000 Amperes, even up to 20,000 Amperes, at a higher voltage of at least 100,000 Volts (100 kV).

The primary switch 18 and/or the secondary switch 24 may in particular be of the circuit-breaker type, of the circuit breaker-disconnector type, of the cutout type, etc. In the more specific examples described below with reference to FIGS. 1 to 6, the primary switch 18 and the secondary switch 24 are for example each formed by a circuit-breaker.

For the embodiments of FIGS. 1 to 6, the primary switch 18 and, for all the embodiments, the secondary switch 24 are preferably both mechanical electrical cut-off apparatuses, in which the electrical cut-off is obtained by displacement, in particular by spacing, of two electrical contacts or pairs of electrical contacts. In the mechanical apparatuses, the displacement of the electrical contacts is generally made by mechanical, pneumatic, hydraulic or electrical maneuvering members or actuators, possibly through a movement transfer kinematics. This displacement can be electronically monitored. As indicated above, in the presence of a high current and/or voltage, the mechanical separation of the electrical contacts can result in the establishment of an electric arc between the two electrical contacts of the switch, due to significant energies accumulated in the network that the apparatus protects. As long as the electric arc remains established through the mechanical separation, the switch does not achieve the electrical cut-off since a current continues to flow through the switch by the presence of the arc. As will be seen below, the invention provides means for ensuring the electrical cut-off, in the sense of the effective interruption of the flow of electric current.

The primary switch 18 and/or the secondary switch 24 can each be constituted by a single mechanical electrical cut-off apparatus, or can each be constituted by several mechanical electrical cut-off apparatuses arranged electrically in series and/or in parallel. It may be an apparatus called "metal shell" apparatus where the current supply means (also called "busbar") are enclosed in a sealed enclosure filled with an insulating fluid. The metal shell apparatuses can in particular be designed in a more compact manner than the apparatuses where the insulation is made in the air.

A mechanical electrical cut-off switch may be in the conventional form including in particular two electrodes which are held, by insulating supports, in fixed positions remote from the peripheral wall of an enclosure which is at earth potential. These electrodes are electrically linked or electrically separated depending on the position of a movable connection member forming part of one of the electrodes, for example a sliding tube actuated by a command. The tube is generally carried by an electrode, to which it is electrically linked, and the separation of the tube from the opposite electrode is susceptible to create an electric arc which may elongate during the opening movement of the switch during which the tube moves away from the opposite electrode. A mechanical electrical cut-off switch conventionally includes two pairs of electrical contacts carried by the tube and the two electrodes. The first pair is the pair through which the nominal current passes in the fully closed position of the apparatus. This first pair of contacts can be assisted by a second pair of contacts, called arcing contacts or pair of secondary contacts. The two contacts of this second pair are intended to remain in sharp contact during the separation of the first pair so as to minimize the arcing phenomenon on the first pair. This allows guaranteeing a good state of electrical conduction in the fully closed position, at the first pair of contacts. Conversely, the contacts of the second pair separate ultimately and the electric arc is established.

In some embodiments of the invention, the secondary switch 24 is an insulating fluid switch, or includes at least one insulating fluid switch, in particular one insulating gas switch. This type of switches is particularly adapted to the interruption of "high voltage A" currents, even more to the interruption of "high voltage B" currents. In such an apparatus, the active cut-off members, in particular the electrical contacts, are enclosed in a sealed enclosure in which there is an insulating fluid which can be a gas, commonly sulfur hexafluoride (SF6), or a mixture of gases, but liquids or oils can also be used. The insulating fluid may be a pressurized fluid, for example at a pressure greater than or equal to 3 bars absolute. This fluid is chosen for its insulating nature, in particular so as to have a dielectric strength greater than that of the dry air at equivalent pressure.

In some embodiments, the primary switch 18 is a vacuum switch, or includes at least one vacuum switch, where the active cut-off members, in particular the electrical contacts, are enclosed in a sealed enclosure in which the pressure is lower than atmospheric pressure, in particular less than 100 millibars, in particular less than 10 microbars. Such a switch has the advantage of being able to ensure a complete electrical cut-off even in the case of a current which has a high intensity variation rate, it is for which the value of the derivative of the intensity with respect to time (dI/dt) is high.

Thus, in some embodiments, including the embodiment which will be described in more detail later, the primary switch 18 is or includes a vacuum switch and the secondary switch 24 is or includes an insulating fluid switch, in particular an insulating gas switch. However, other combinations are possible, for example a combination in which the device includes a primary switch and a secondary switch of the same technology, in particular both of the vacuum switch type.

As can be seen in FIG. 1, the device 10 includes a primary surge protector 30 arranged electrically in parallel with the primary diversion member, for example the primary switch 18, between the primary point 12 and the intermediate point 13.

Such a surge protector 30 allows limiting the amplitude of the potential difference across the primary diversion member, for example the primary switch 18, or more generally of any component or set of components, in parallel with which it is arranged. A surge protector, or voltage surge arester, is therefore a device which limits the voltage peaks to its terminals. A surge protector generally comprises an electrical component which has a variable resistance as a function of the electric voltage thereacross. The variation of the resistance value is generally not linear with the electrical voltage across the surge protector. Generally, below a transition voltage across the surge protector, the resistance of the latter is high, with a zero or relatively small decrease of its resistance as a function of the increase of the voltage, and the surge protector lets through only a leakage current, preferably less than 1 ampere (A), or even less than 100 milliamperes (mA). On the contrary, above the transition voltage across the surge protector, the resistance of the latter decreases rapidly as a function of the increase of the voltage, which reaches a clip voltage value, or protection voltage, for which the resistance of the surge protector becomes low, or even very low. In other words, the surge protector acts as a voltage limiter thereacross over the current interval for which it was chosen. It opposes the protection voltage when the highest current for which the surge protector has been dimensioned is let through. Below the transition voltage, it tends to prevent the passage of the current. Beyond the transition voltage, it authorizes the passage of the current through the surge protector for a small increase of the voltage thereacross. In a known manner, the transition voltage is generally not an accurate value but rather corresponds to a transition voltage range. However, in the present text, it will be defined that the transition voltage of a surge protector is the voltage for which the surge protector lets a current of 1 ampere (A) pass therethrough. The protection voltage is the voltage across the surge protector when it is traversed by the largest current for which it has been dimensioned. Among the surge protectors, lightning arresters are known in particular, which may in particular comprise the varistors and TVS (Transient Voltage Suppressor) diodes, such as the Transil™ diodes. In particular, within the framework of the invention, a surge protector, in particular the primary surge protector 30 may comprise a metal oxide varistor (MOV).

Advantageously, it can be provided that the transition voltage of the primary surge protector 30 may be less than one twentieth of the nominal voltage of the electrical installation in which the cut-off device 10 is inserted, even less than one hundredth of this voltage. Thus, for a nominal voltage of the electrical installation comprised in the range from 100,000 to 500,000 volts, the primary surge protector 30 can have a transition voltage comprised in the range from 200 volts to 50,000 volts, preferably comprised in the range from 200 Volts to 5,000 Volt.

The transition voltage of the primary surge protector 30 is therefore strictly lower, and much lower, than the nominal voltage of the electrical installation in which the cut-off device 10 is inserted.

The protection voltage of the primary surge protector 30 is also preferably strictly lower than the nominal voltage of the electrical installation in which the cut-off device 10 is inserted. Advantageously, it can be provided that the protection voltage of the primary surge protector 30 may be less than a fifth, even less than a tenth of the nominal voltage of the electrical installation in which the cut-off device 10 is inserted, even less than one fiftieth of this voltage.

Thus, by choosing a primary surge protector 30 whose protection voltage is much lower than the nominal voltage of the electrical installation in which the cut-off device 10 is inserted, therefore typically less than 75,000 volts or less, it is ensured that the voltage across the primary diversion member, for example the primary switch 18, remains less than or equal to this protection voltage. This allows, for example, using a switch whose cost and bulk are much lower than the equivalent systems capable of withstanding higher voltages.

The primary surge protector 30 can be designed as a set of several discrete components arranged electrically in series and/or in parallel. Each discrete component is, for example, a lighting arrester, in particular a varistor, such as a metal oxide varistor, or a TVS diode. Preferably, the set of several discrete components arranged electrically in series and/or in parallel has, from the point of view of the remainder of the device, the behavior of a single surge protector having an equivalent transition voltage as a whole and a protection voltage as a whole.

As can be seen in FIGS. 1 to 7, the cut-off device according to the invention 10 includes a resonator 32 including at least a main inductance 33 and a main capacitance 34 electrically in series, the resonator having a first terminal 32a and a second terminal 32b, the second terminal 32b of the resonator 32 being electrically linked to the secondary point 14 of the main line 16. In the examples, the second terminal 32b of the resonator 32 is at the same electric potential as the secondary point 14 of the main line 16. In these examples, the resonator 32 is therefore a series LC dipole. It could be possible to provide that the resonator 32 has a certain electrical resistance value, thus forming a series RLC dipole, but it is preferable in this case that the resistance value is very low, preferably negligible. The electrical characteristics of the resonator 32 are determined as a function of the maximum intensity of current to be cut off, and as a function of the cut-off performance of the secondary switch 24, in particular as a function of the maximum current intensity variation value dI24/dt for which this secondary switch 24 is capable of interrupting the current. Indeed, the electrical characteristics of the resonator 32 determine the natural resonant frequency of the resonator 32, and therefore the maximum current intensity variation value dI24/dt during zero crossings of the intensity through the secondary switch 24. In the case where the resonator 32 is a series LC dipole, this induces the dimensioning of the capacitance values C34 of the capacitance 34 and of the inductance values L33 of the inductance 33 of the resonator 32.

The resonator 32 is associated with a main surge protector 31 which is electrically arranged in parallel at least with the main capacitance 34 of the resonator 32. In the examples illustrated, the main surge protector 31 is electrically arranged in parallel only with the main capacitance 34 of the resonator 32. Thus, each of the terminals of the main surge protector 31 is at the same electric potential as one of the terminals of the main capacitance 34 of the resonator 32. However, the main surge protector 31 could be arranged electrically in parallel with the resonator 32 as a whole, with each of the terminals of the main surge protector 31 at the same electric potential as one of the terminals of the resonator 32.

Advantageously, as in the illustrated example, it can be provided that the main surge protector 31 is a surge protector whose transition voltage is of the same order of magnitude as the nominal voltage of the electrical installation in which the cut-off device 10 is inserted, while being preferably greater than this nominal voltage of the electrical installation in which the cut-off device 10 is inserted. The transition voltage of the main surge protector 31 is for example comprised in the range from 100% to 150% of the nominal voltage of the electrical installation in which the cut-off device 10 is inserted. It can be provided that the main surge protector 31 is a surge protector whose protection voltage is comprised in the range from 150% to 300% of the nominal voltage of the electrical installation in which the cut-off device is inserted 10.

The resonator 32 is associated with a main oscillation switch 36. The main oscillation switch 36 includes a three-terminal changeover switch comprising:

a direct terminal 361 electrically linked to the primary point 12 of the main line 16;

an inverting terminal 362 electrically linked to the intermediate point 13 of the main line 16;

an output terminal 363 electrically linked to the first terminal 32*a* of the resonator 32.

In the examples, the direct terminal 361 is at the same electric potential as the primary point 12 of the main line 16.

In the examples, the inverting terminal 362 is at the same electric potential as the intermediate point 13 of the main line 16.

In the examples, the output terminal 363 is at the same electric potential as the first terminal 32*a* of the resonator 32.

The main oscillation switch 36 can be referred to as three-position changeover switch because it can switch at least between the three following states:

a direct state in which the output terminal 363 is only electrically linked to the direct terminal 361;

an inverting state in which the output terminal 363 is only electrically linked to the inverting terminal 362; and an isolated state in which the output terminal 363 is electrically isolated from the direct terminal 361 and from the inverting terminal 362, as illustrated in FIG. 1.

In the examples illustrated in FIGS. 1 to 7, it is provided that the main oscillation switch consists only of the changeover switch 36. In the examples illustrated in FIGS. 4 to 6, it is provided that the changeover switch forming the main oscillation switch 36 includes a switch 36D, which will be called direct switch, between the direct terminal 361 and the output terminal 363, and a switch 36V, which will be called reversing switch, between the inverting terminal 362 and the output terminal 363, each switch being able to be in an open state or in a closed state, with at most only one of the two direct and reversing switches which is in a closed state at a given time point.

Preferably, the main oscillation switch 36 is bidirectional, that is to say, capable of allowing the current to flow in both directions in its direct state and in its inverting state. In the examples illustrated in FIGS. 4 to 6, the direct switch 36D and the reversing switch 36V are thus preferably bidirectional switches.

Preferably, the main oscillation switch 36 is electronically controlled between its different states, for example by means of an electronic control unit. In the examples illustrated in FIGS. 4 to 6, the direct switch 36D and the reversing switch 36V are electronically controlled between their open state and their closed state, and vice versa.

Preferably, the main oscillation switch 36 is a semiconductor switch. In the examples illustrated in FIGS. 4 to 6, the direct switch 36D and the reversing switch 36V are semiconductor switches, although mechanical switches can also be envisaged. Each of the direct switch 36D and of the reversing switch 36V can, as in the example of FIG. 4, be designed as an assembly of two thyristors 36Da, 36Db, or 36Va, 36Vb, mounted head-to-tail, each in one of two branches electrically in parallel. The use of thyristors allows transiting high intensity currents by using fewer and/or more compact components. The thyristors may be of the GTO (gate turn-off) type, allowing obtaining, with equivalent electrical characteristics, an even more compact device. An assembly of two thyristors mounted head-to-tail is analogous to a TRIAC. The use of two thyristors mounted head-to-tail allows making bi-directional semiconductor switches with electronically controlled closing. FIG. 5 illustrates the case where, in a mounting similar to that of FIG. 4, each thyristor is electrically associated in series, in its branch, with a diode 36Da', 36Db' or 36Va', 36Vb'. The use of thyristors will be advantageous to benefit from the property of these components to automatically return to their blocked state when the current passing therethrough becomes zero. Instead of thyristors, other semiconductor components could be used, such as insulated gate bipolar transistors (IGBTs), or controlled spark-gaps.

For reasons of voltage withstand or current handling, each of the direct switch 36D and/or of the reversing switch 36V can be designed as a set of switches arranged electrically in series and/or in parallel but can preferably be controlled so as to behave as a single switch with respect to the remainder of the device.

However, it is noted that placing the main oscillation switch 36 in the device 10 means that, in normal operation, when the primary diversion member, for example the primary switch 18, and the secondary switch 24 are in their on-state letting the nominal current through, no current passes through the main oscillation switch 36, which limits the electrical losses and limits the wear of the components implemented in the main oscillation switch 36.

In the examples illustrated, a surge protector 37 has been provided across the direct switch 36D, that is to say in parallel with the direct 361 and output 363 terminals of the changeover switch 36. The surge protector 37, which is optional, is thus electrically arranged between the primary point 12 and the first terminal 32*a* of the resonator 32. However, the surge protector 37, which is optional, could be electrically arranged between the intermediate point 13 and the first terminal 32*a* of the resonator 32. The device 10 can be advantageously dimensioned so that the surge protector 37 has its transition voltage greater than the highest voltage that the changeover switch 36 has to withstand during the cut-off of the greatest current. Furthermore, the changeover switch 36 is advantageously dimensioned to be able to withstand the sum of the protective voltage of the surge protector 37 with the protective voltage of the surge protector 30. In the examples illustrated, the surge protector 37 is arranged such that the main surge protector 31 is electrically in parallel with the capacitance 34, but not with the surge protector 37. Alternatively, in the presence of such a surge protector 37, the main surge protector 31 could be arranged electrically in parallel with the assembly of the capacitance 34 and of the surge protector 37, or even be arranged electrically in parallel with the assembly of the resonator 32 and of the surge protector 37.

In some embodiments, such as those illustrated in FIGS. 1 to 7, a circuit for discharging the main capacitance 34 is provided. In the examples illustrated, the discharge circuit is a passive discharge circuit, not including any active component. In this example, the discharge circuit includes a resistance 39 which is arranged in parallel with the main capacitance 34. Preferably, the resistance 39 has a high electrical resistance value R39, for example greater than 100,000 Ohm, such that the dipole which consists of the main capacitance 34 and of the resistance 39 arranged in parallel has a time constant that is significant relative to an electrical cut-off time in the secondary switch 24, for example a time constant greater than 50 milliseconds, preferably greater than 100 milliseconds. In this example, the time constant is equal to the product R39×C34. Another type of discharge circuit, not illustrated in the drawings, may include at least one active component, such as a controlled switch. Thus, a discharge circuit could comprise a controlled switch which would be arranged directly in series electrically with the resistance 39, the set of these two components being in parallel with the main capacitance 34. When the controlled switch would be switched to a closed state letting the current through, a discharge circuit would be formed between the two armaments of the main capacitance 34.

In the examples illustrated in FIGS. 1 to 6, including a primary mechanical switch 18 as a primary diversion member, the cut-off device 10 advantageously includes, but as an option, a circuit for assisting the effective electrical cut-off of the current through the primary switch 18, here designed as an auxiliary oscillation circuit 40 which is arranged electrically in parallel with the primary switch 18 between the primary point 12 and the intermediate point 13. The auxiliary oscillation circuit 40 is designed and able to generate a zero crossing of the current through the primary switch 18, and here only through the primary switch 18 and not through the secondary switch 24.

The purpose of such an auxiliary oscillation circuit 40 is to promote the electrical cut-off through the primary switch 18 when the latter is mechanically open. Indeed, it has been seen that, even after opening of such a switch, an electric arc can be established between the separate contacts of the switch, preventing the achievement of an effective electrical cut-off. The zero crossing of the current through the primary switch, generated by the auxiliary oscillation circuit 40, allows promoting the electrical cut-off through the primary switch 18.

Different embodiments are possible for such an auxiliary oscillation circuit 40. In particular, it is possible to use an oscillation circuit as described in some documents of the prior art.

In some embodiments, such as those illustrated, the auxiliary oscillation circuit 40 includes at least an auxiliary inductance 42, an auxiliary capacitance 44, and an auxiliary oscillation trigger 46, arranged electrically in series in the auxiliary oscillation circuit 40 in parallel with the primary switch 18 between the primary point 12 and the intermediate point 13. In variants not illustrated, an auxiliary oscillation circuit 40 could be used including only an auxiliary inductance, an auxiliary capacitance and an auxiliary oscillation trigger, electrically arranged in series in the auxiliary oscillation circuit in parallel with the primary switch 18 between the primary point 12 and the intermediate point 13.

For the operation of an auxiliary oscillation circuit 40, it may be advantageous for the auxiliary capacitance to be pre-charged before the triggering of the auxiliary oscillation circuit 40. In this case, the auxiliary oscillation circuit 40 may include, in addition, a circuit for pre-charging the auxiliary capacitance 44 (not illustrated in the figures).

Moreover, as in the examples illustrated, a pilotable device (50, 50') allowing varying the resistance value inserted in series in the auxiliary oscillation circuit 40 can be advantageously provided, in such an auxiliary oscillation circuit.

Thus, in the examples illustrated, the auxiliary oscillation circuit 40 includes at least one damping resistance 48 and at least one bypass switch 50 of the damping resistance. The bypass switch 50 is susceptible to switch between an open state and a closed state. The damping resistance 48 and the bypass switch 50 are arranged such that, in a state of the bypass switch 50, the damping resistance 48 is electrically in series in the auxiliary oscillation circuit 40 with the inductance 42, the auxiliary capacitance 44, and the auxiliary oscillation trigger 46, while in the other state of the bypass switch 50, the damping resistance 48 is short-circuited relative to the auxiliary oscillation circuit 40.

It is noted that the damping resistance 48 can be designed as a set of several discrete components arranged electrically in series and/or in parallel. The associated bypass switch 50 is then generally arranged electrically in parallel with the set.

In the examples, the damping resistance 48 is electrically in series with the auxiliary inductance 42, the auxiliary capacitance 44 and the auxiliary oscillation trigger 46, in an electric line of the auxiliary oscillation circuit 40 which extends from primary point 12 to the intermediate point 13, here directly and only in parallel with the primary switch 18. The bypass switch 50 is arranged directly and only in parallel with the damping resistance 48. Thus, when the bypass switch 50 is in an open state, the damping resistance 48 is electrically in series in the auxiliary oscillation circuit 40 with the auxiliary inductance 42, the auxiliary capacitance 44 and the auxiliary oscillation trigger 46, while, when the bypass switch 50 is in a closed state, the damping resistance 48 is short-circuited relative to the auxiliary oscillation circuit 40.

The auxiliary oscillation trigger 46 is a switch, advantageously a semiconductor switch, although a mechanical switch can also be envisaged. It is preferably bidirectional. It can thus be, as in the examples, designed as an assembly in parallel with two thyristors mounted head-to-tail. Such an assembly is analogous to a TRIAC. However, other semiconductor components could be used, such as for example IGBTs or other types of controlled spark-gaps. For reasons of voltage withstand or current handling, the auxiliary oscillation trigger 46 can be designed as a set of switches electrically arranged in series and/or in parallel but can be preferably controlled so as to behave like a single switch with respect to the remainder of the device.

The bypass switch 50 is advantageously a semiconductor switch, although a mechanical switch can also be envisaged. It is preferably bidirectional. It can thus be, as in the examples, designed as a parallel assembly of two thyristors 50a, 50b mounted head-to-tail. Such an assembly is analogous to a TRIAC. However, other semiconductor components could be used, such as for example IGBTs or other types of controlled spark-gaps. For reasons of voltage withstand or current handling, the bypass switch 50 can be designed as a set of switches arranged electrically in series and/or in parallel but can be preferably controlled so as to behave like a single switch with respect to the remainder of the device.

According to variants not illustrated, the auxiliary oscillation circuit 40 could include at least one permanent resistance, permanently inserted in the auxiliary oscillation circuit 40, electrically in series with the auxiliary inductance 42, the auxiliary capacitance 44 and the auxiliary oscillation trigger 46, with the result of determining a minimum resistance value of the oscillating circuit, when the damping resistance 48 is short-circuited relative to the auxiliary oscillation circuit 40. The permanent resistance could be designed as a set of several discrete components arranged electrically in series and/or in parallel.

According to yet another variant of an auxiliary oscillation circuit 40, the auxiliary oscillation circuit 40 could include at least a second damping resistance and at least a second bypass switch associated with the second damping resistance, arranged, for example in parallel with each other, such that, in a state of the second bypass switch, the second damping resistance would be electrically in series in the auxiliary oscillation circuit 40 with the inductance 42, the capacitance 44 and the oscillation trigger 46, and with the first damping resistance 48 if the latter is inserted in the auxiliary oscillation circuit 40. In the other state of the second bypass switch, the second damping resistance would be short-circuited relative to the auxiliary oscillation circuit 40. Of course, this variant could be generalized to more than two damping resistances, and consequently more than two bypass switches. By having several damping resistances each associated with a bypass switch, it can be provided that the bypass switches are controlled simultaneously. On the contrary, it can be provided that at least some of the bypass switches of the oscillation circuit are switched with a time offset from each other. Thus, the total resistance value of the oscillating circuit can be adapted to more than two resistance value stages.

It is noted that the two variants mentioned above can be combined in an oscillation circuit including both at least one permanent resistance and several damping resistances, all being inserted in series or susceptible to be inserted in series with each other in the oscillation circuit.

Other embodiments for an auxiliary oscillation circuit 40 can be provided, for example implementing controlled switches, for example semiconductor switches configured according to an H-bridge, according to a half-bridge, etc. These switches can each be designed as an IGBT (Insulated Gate Bipolar Transistor), thyristors, or other type of transistor. Generally, the invention can be implemented with yet other types of circuits for assisting the effective electrical cut-off of the current through the primary switch 18, in particular as described in the prior art documents mentioned in the preamble.

In one method for piloting a cut-off device 10 according to the invention, with a view to bringing the device from its closed state to its open state, the switching of the primary diversion member to its diversion state on the one hand and the mechanical opening the secondary switch 24 on the other hand, are provided.

In the case where the primary diversion member is a switch, its switching to its diversion state corresponds to the opening of the switch. The method then comprises a step comprising the mechanical opening of the primary switch 18 and of the secondary switch 24. The two switches can be opened mechanically simultaneously or successively in any order.

It is for example assumed that this opening and/or switching is/are effective at a first time point. The step of opening the secondary switch or both switches and, for some variants of the embodiment of FIG. 7, the step of controlling the switching of the current limiter, can be triggered under normal charge, for example with a current I12 less than or equal to a maximum nominal current provided through the device 10, by a simple willingness to open the cut-off device, for example with a view to electrically isolating a portion of the electrical installation electrically linked to the primary point 12 of the device 10 relative to another portion of the electrical installation electrically linked to the secondary point 14 of the device 10. The step of opening the secondary switch or the two switches and, for some variants of the embodiment of FIG. 7, the step of controlling the switching of the current limiter, can be triggered in the presence of an electrical fault in the electrical installation, for example with a current I12 equal to a fault current through the cut-off device 10. This fault current may be greater than the maximum nominal current through the device 10. Such an opening in the presence of a fault may result from the detection of this fault, in particular from the detection of one or more parameters of the current through the device 10, for example the intensity of the current through the device 10. It is noted, as described above, that it is possible that the mechanical opening of the switch or of the two switches 18, 24 does not allow, on its own, the electrical opening in the sense of interruption of the passage of the current through the cut-off device 10, because of the establishment of an electric arc through the switch 24 or each of the two switches. For the description of the following method, it is this hypothesis that is made.

In this hypothesis, in a device such as in FIGS. 1 to 6 including a primary switch 18 as a diversion member, the method provides for cutting off the current in the open primary switch 18 to cause the appearance, across the primary switch, of a voltage greater than the transition voltage of the primary surge protector 30 suitable for switching it to a current conduction mode. To cut off the current in the open primary switch 18, either of the auxiliary oscillating circuits 40 as described above can be used, as will be described below. However, the current cut-off in the open primary switch 18 can be obtained by other means, in particular by a suitable dimensioning of the primary switch 18, even if this dimensioning leads to a primary switch which is bulkier and/or more expensive than the dimensioning that can be used in case of presence of an oscillation circuit. The implementation of the auxiliary oscillation circuit 40 begins at a second time point, subsequently to the first time point, this second time point corresponding to the closing of the auxiliary oscillation trigger 46, and it is assumed that this electrical opening of the primary switch 18 is effective at a third time point subsequent to the second time.

In all cases, this cut-off of the current through the primary switch 18, or the switching of the current limiter 180 in its diversion state, results in the appearance of a voltage across the primary surge protector 30, and therefore of the same voltage across the primary switch 18 or of the current limiter 180. In the hypothesis of a large fault current, this voltage reaches the protection voltage of the primary surge protector 30, at a fourth time point subsequent to the third time point. The resistance of the primary surge protector 30 then varies in order to limit the increase of the voltage, which reaches a stage. At this point, it is considered that the primary surge protector 30 becomes conducting for the current. Thus, in a device such as in FIGS. 1 to 6, it can be considered that, from this fourth time point, the current through the device 10 passes through the primary surge protector 30 but continues to flow through the secondary switch 24 due to the presence of an electric arc between the contacts of the latter. In the embodiment of FIG. 7, a small part of the current passes through the current limiter 180 while a large majority of the current passes, in parallel, through the primary surge protector 30.

For the devices such as in FIGS. 1 to 6, to cause the cut-off of the electric arc in the secondary switch 24, it should be preferably expected that the current through the auxiliary oscillation trigger 46 is canceled out, and that it recovers its insulation.

For all the embodiments, to cause the cut-off of the electric arc in the secondary switch 24, the resonator 32 is used by adequately controlling the main oscillation switch 36, from the time point te1.0 of the first changeover of the changeover switch 36 in FIGS. 8 and 9, this time point te1.0 of the first changeover of the changeover switch 36 being subsequent to the fourth time point at which it is considered that the primary surge protector 30 becomes conducting for the current.

The control of the main oscillation switch 36 comprises in particular, from the time point te1.0 of the first changeover, the step of repeatedly switching the three-terminal changeover switch between its direct and inverting states, by passing at each alternation through the isolated state. This changeover is preferably carried out at a frequency of changeover cycles adapted to a resonant frequency of the main oscillation circuit, which is in particular determined by the natural resonant frequency of the main resonator 32.

In the direct state of the changeover switch 36, a circuit for charging the main capacitance 34 is formed in the device, which is illustrated in FIG. 2. In the inverting state of the switch 36, a circuit for inverting the charge polarity of the main capacitance 34 is formed in the device, which is illustrated in FIG. 3.

In the remainder of the description, it is assumed that a fault current I12 flows through the device 10 from the primary point 12 to the secondary point 14, from left to right in the figures. It is recalled that, in the embodiments illustrated, the device is bidirectional, in the sense that it is capable of interrupting a fault current regardless of the direction of flow of this fault current through the device 10.

FIG. 8 illustrates the variation over time of the following parameters:
- the intensity I12 of the current through the device 10;
- the voltage V1214 across (at the terminals 12, 14 of) the device 10;
- the intensity I34 of the current through the main capacitance 34;
- the voltage V34 across the main capacitance 34;
- the intensity I30 of the current through the primary surge protector 30;
- the voltage V30 across the primary surge protector 30;
- the intensity I24 of the current through the secondary switch 24.

FIG. 9 illustrates, in an initial phase of the changeover of the changeover switch 36, the variation as a function of time of the following parameters:
- the intensity I34 of the current through the main capacitance 34;
- the voltage V34 across the main capacitance 34;
- the intensity I30 of the current through the primary surge protector 30;
- the intensity I24 of the current through the secondary switch 24.

FIG. 10 illustrates, in a final phase of the changeover of the changeover switch 36, the variation as a function of time, of the following parameters:
- the intensity I12 of the current through the device 10;
- the intensity I34 of the current through the main capacitance 34;
- the voltage V34 across the main capacitance 34;
- the intensity I30 of the current through the primary surge protector 30;
- the voltage V30 across the primary surge protector 30;
- the intensity I24 of the current through the secondary switch 24.

As can be seen in FIGS. 8 and 10, the cut-off of the electric arc in the secondary switch 24 is obtained after a number "n" of changeover cycles of the changeover switch 36, at a time point te(n).0=tf. In practice, the active phase of cyclic changeover of the changeover switch 36, which begins at the time point te1.0 of first changeover of the changeover switch 36 and which ends at the time of the cut-off of the electric arc in the secondary switch 24, has a duration whose order of magnitude may be comprised between 100 microseconds and 20 milliseconds.

For the following description, it is considered that in the initial state, until the time point te1.0 of first changeover, the changeover switch 36 is in its isolated state, and it is considered that the main capacitance 34 is discharged, for example by the presence of the discharge circuit which is here designed by the discharge resistance 39. It is also considered that, in the example illustrated, the resistance value R39 of the discharge resistance 39 is sufficiently large to neglect the discharge current through the discharge resistance 39 during the entire active phase of cyclic changeover of the changeover switch 36.

Therefore, at the time point te1.0 of the first changeover and due to the presence of a potential difference across the primary surge protector 30, the current through the device 10 partially switches to the resonator 32 to charge the main capacitance 34, on a first charge cycle, this during a period called direct charge period of this first cycle, which lasts until a time point te1.1 at which the changeover switch 36 switches to its isolated state. During this direct charge period of the first cycle, it is seen in FIG. 9 that the current in the main capacitance 34 corresponds to the direct charge of the resonator 32, which is in the illustrated case of the LC series type, with a current first increasing up to a intensity peak value I34.1 of the current in the main capacitance 34 for this direct charge period (hereinafter intensity of the direct charge current) of the first cycle, then decreasing up to the zero value, according to one half-alternation. The duration of this half-alternation depends directly on the natural resonant frequency of the resonator 32, which is equal to $1/(2\pi/\sqrt{L33 * C34})$. This natural resonant frequency will for example be comprised between 0.1 kHz to 100 kHz, preferably comprised between 1 kHz to 10 kHz. It is noted that, during this direct charge period, and this will be true for each changeover cycle, the intensities of the currents I30 in the primary surge protector 30 and I24 in the secondary switch 24 are decreased by the intensity of the direct charge current I34. For the first cycles, the intensity of the direct charge current I34.1 is much lower than the intensity of the current I12 passing through the device 10, especially if it is a fault intensity.

Preferably, the time point te1.1 at which the changeover switch 36 switches to its isolated state corresponds to reaching this zero value of the intensity of the direct charge current at the end of this half-alternation of the current in the main capacitance 34. This results in a charge in the main capacitance 34, therefore a voltage V34 thereacross which reaches, at the end of this direct charge period of the first cycle, a value V34.1.

The changeover switch remains in its isolated state for an isolation duration from the time point te1.1 at which the switch 36 switches to its isolated state, until a time point te1.2 at which the changeover switch 36 switches to its inverting state for this first cycle, for a period called inversion period of this first cycle, which lasts until a time point te1.3 at which the changeover switch switches again to its isolated state. During this inversion period of the first cycle, it is seen in FIG. 9 that the current in the main capacitance 34 corresponds to an inversion of the charge of the resonator 32, which is here of the LC series type, with a current that flows this time in the opposite direction through the resonator 32, and therefore through the main capacitance 34 first decreasing (therefore increasing in absolute value) to a value of the module of the intensity peak I34.1' of the current in the main capacitance 34 for this inversion period (hereinafter intensity of the inverting current) of the first cycle, then increasing (therefore decreasing in absolute value) to the zero value, according to one half-alternation. In the same cycle, the value of the module of the intensity peak I34.1' of the current in the main capacitance 34 for the inversion period is greater than the value of the intensity peak I34.1 of the current in the main capacitance 34 for the direct charge period which precedes said inversion period.

Preferably, the time point te1.3 at which the changeover switch 36 switches again to its isolated state corresponds to reaching this zero value at the end of this half-alternation in the opposite direction of the current in the main capacitance 34. This results in a charge in the main capacitance 34, therefore a voltage V34 thereacross which reaches the same absolute value as at the end of the direct charge period which precedes said inversion period, but with a reverse polarity across the main capacitance 34. It is noted that, during this inversion period, and this will be true for each changeover cycle, the intensity of the current I24 in the secondary switch 24 is increased by the value of the intensity of the inverting current I34. Indeed, the inverting current flows in such a direction that, through the secondary switch, it is added to the current I12 through the device 10.

The changeover switch 36 remains in its isolated state during a new isolation duration from the time point te1.3 at which the changeover switch 36 has switched again to its isolated state, until a time point te2.0 at which the changeover switch 36 switches to its direct state to start a second cycle. The time point te2.0 therefore corresponds to the end of the first charge cycle of the main capacitance 34 of the resonator 32.

The second charge cycle begins, like all the next cycles, with a period called direct charge period, which lasts until a time point te2.1 at which the changeover switch switches to its isolated state. During this direct charge period of the second cycle, it is seen in FIG. 9 that the current in the main capacitance 34 increases up to a peak value I34.2 for this direct charge period of the second cycle, then decreases to the zero value, in one half-alternation. Compared to the first cycle, the initial charge of the main capacitance 34 is greater. For this second cycle, it is seen that the intensity peak I34.2 of the direct charge current through the main capacitance 34 is greater than the intensity peak I34.1 of the direct charge current through the main capacitance 34 for the previous cycle. During this second direct charge period, the intensity of the current I24 in the secondary switch 24 temporarily decreases to a value I24.2 smaller than the value I24.1 reached during the first direct charge period. Furthermore, the charge in the main capacitance 34, therefore the voltage V34 thereacross, reaches a value V34.2 which is greater than the value V34.1 reached in the first cycle.

It is understood that, as the charge cycles progress, the voltage V34 across the main capacitance 34 increases, as well as the value of the intensity peak of the direct charge current through the main capacitance 34 also increases. Consequently, the intensity of the current I24 in the secondary switch 24 temporarily decreases to a value which is, for each cycle, smaller than the value reached for the previous cycle. This is how, as illustrated in FIG. 10, when an "$n^{th}$" cycle arrives, the value of the intensity peak I34.$n$ of the direct charge current through the main capacitance 34 reaches a value such that the intensity of I24 in the secondary switch 24 decreases temporarily to a zero value, with a current variation just before the current is canceled out dI24/dt sufficiently low to allow the extinction of the electric arc through the secondary switch 24. In particular, it is seen that, in the example illustrated, the value of the peak intensity I34.$n$ of the direct charge current through the main capacitance 34 reaches a value equal, in absolute value, to the value of the current I12 through the device. From this interruption, at the end of the cycle which begins at the time point te(n).0, the intensity of I24 in the secondary switch 24 becomes zero. The current then tends to increase the voltage V34 across the main capacitance 34 until the latter reaches the protection voltage value of the main surge protector 31 that protects it. The current flowing through the device then begins to flow in the main surge protector 31 while continuing to charge the main capacitance 34. This time point marks the start of a current changeover from the main capacitance 34 to the main surge protector 31. For fault currents, the changeover continues until the current reaches the maximum value for which the device is designed, the voltage across the main surge protector 31 can then reach the protection value. During this period of charge of the main capacitance 34, the voltage thereacross V34 has exceeded the nominal voltage of the network and the device 10 therefore exerts a counter-electromotive force which decreases the fault current passing therethrough. As the current decreases, the voltage across the main surge protector 31 and the main capacitor 24 decreases until the fault current is canceled out.

It is noted that, in the device according to the invention, the changeover switch 36 is traversed by a current only transiently during a cut-off. In addition, it is subjected at most to a fraction of the full voltage of the network to be protected. The maximum voltage across the changeover switch 36 will be all the lower as the L33/C34 ratio of the main resonator 32 will be low.

Advantageously, the energy implemented in the resonator 32 to ensure the cut-off of the secondary switch 24 is drawn directly from the line that is to be protected. There is no need for an additional charge circuit. There is also no need to provide for a pre-charging of a capacitance.

In the examples of FIGS. 4 to 6, changeover switch 36 can be formed of thyristors, which is advantageous because a thyristor opens automatically when the current therethrough becomes zero. It allows simplifying the control of the device since only the time points of changeover to the direct state or to the inverting state require an active control. The time points of changeover to the isolated state are obtained automatically when, due to the resonant nature of the resonator 32, the current imposed by the resonator 32 passes through a zero value at the end of half-alternation. For example, there is no need for a zero current detection circuit.

With thyristors, it can be provided that the periods during which the changeover switch remains in its isolated state, between a direct charge period and an inversion period, or one between an inversion period and a direct charge period, last the time necessary for the deionization of the thyristor which was conducting in the just preceding period.

However, there is no need for accurate monitoring of this duration. It is sufficient that the half-cycle durations, on the one hand between the changeover time point te1.0, . . . , te(n).0, to the direct charge state and the changeover time point te1.2, . . . , te(n).2 to the immediately following inverting state, and on the other hand between the changeover time point to the inversion state te1.2, . . . , te(n).2 and the changeover time point te1.0, . . . , te(n).0, to the immediately following direct charge state, are greater than the duration of the half-alternation added to the time necessary for the deionization of the thyristor which was conducting in the just previous period. The duration of the half-alternation depends directly on the natural resonant frequency of the main resonator 32, but it can drift over time, for example following the aging of the components. Likewise, the time necessary for the deionization of the thyristor may drift over time, for example following the aging of the components. It is possible, by providing for longer half-cycle durations by a certain margin relative to the sum of these two durations, to determine a constant half-cycle duration, which does not need to be strictly defined relative to these values. However, it is important that the half cycle duration(s) is/are short, in order to obtain the interruption of the current through the secondary switch 24 in the shortest possible period of time. In this sense, it will be provided to repeatedly switch the changeover switch 36 between its direct and inverting states, by passing at each half-alternation through the isolated state, at a frequency of changeover cycles adapted to the natural resonant frequency of the resonator 32, without the changeover cycle frequency being necessarily exactly defined by the resonant frequency of the resonator 32. In general, the changeover cycle frequency will be greater than the natural resonant frequency of the resonator 32, for example comprised between 110% and 200% of the value of the natural resonant frequency of the resonator 32.

The embodiment of FIG. 5 comprises all the components of that of FIG. 4. It also comprises saturable impedances to facilitate the interruption of the current. There is thus represented a saturable impedance 118 arranged electrically in series with the primary switch 18 between the primary point 12 and the intermediate point 13, a saturable impedance 124 arranged electrically in series with the secondary switch 24 between the intermediate point 13 and the secondary point 14, and a saturable impedance 136 electrically arranged between the output terminal 363 of the changeover switch 36 and the first terminal 32a of the resonator 32. The device could include only one or two of these three saturable impedances, and/or include others.

The embodiment of FIG. 6 comprises all the components of that of FIG. 5. It also comprises, in parallel with the main oscillation switch 36, a filtering device which allows limiting the voltage and/or current peaks during changeovers of the main oscillation switch 36. In the example, this filtering device consists of at least one, preferably two snubbers 52. In the example illustrated, a "snubber" 52 is designed as a series RC filter, composed of a resistance and of a capacitance in series. In the example illustrated in FIG. 6, in which the changeover switch forming the main oscillation switch 36 includes a direct switch 36D and a reversing switch 36V, a "snubber" 52 is electrically placed in parallel with the direct switch 36D, and a "snubber" 52 is electrically placed in parallel with the reversing switch 36V.

FIG. 7 illustrates one embodiment in which the primary diversion member is a current limiter 180. Compared to the embodiments described above, the current limiter is therefore substituted instead of the primary switch, between the primary point 12 and the intermediate point 13. As will be understood from the following, such an embodiment allows dispensing with the auxiliary oscillation circuit described above. On the other hand, for the remainder, the cut-off device of FIG. 7 comprises all of the elements that have been described in relation to the embodiments of FIGS. 1 to 6, including the optional possibility of comprising optional/alternative elements of the embodiments of FIGS. 1 to 6.

The current limiter 180 can advantageously comprise a current limiter, preferably of the SCFCL (SuperConducting Fault Current Limiter) type. In this case, it may comprise a superconducting resistance traversed by the current flowing in the main line 16 between the primary point 12 and the intermediate point 13. A current limiter 180 of the superconducting SCFCL type comprises, for example, a cable or tape or other element made of superconducting material, for example in the form of a winding, traversed by the current between the terminals 20 and 22. The element made of superconducting material is for example bathed in a bath of liquid nitrogen in order to keep it below its critical temperature as long as the intensity of the current passing therethrough is smaller than the activation value. The current limiter 180 may include an inductive component, but, in the envisaged application, it is preferred that this inductive component is zero or as low as possible.

In a known manner, a current limiter has an electrical resistance which is null, or which can be considered null, as long as the intensity of the current passing therethrough is smaller than an activation value which is constituted by a threshold intensity passing therethrough. Typically, this electrical resistance is exactly zero at a stable DC current, with the exception of the resistance, which can be considered zero, of the non-superconducting portions such as the imperfections, the joints and the welds. Under these conditions, the potential difference across the current limiter 180 is null or can be considered as null. The current switch is then in a state called on-state and it is then comparable to a switch in a closed state. In this state, it can be considered that all of the current through the device 10 passes through the current limiter 180.

When the value of the intensity of the current through the current limiter exceeds the activation value of the limiter, here called threshold intensity, the electrical resistance of the current limiter increases suddenly, which tends to limit the intensity of the current that can pass through the current limiter and generates a voltage across the current limiter 180. The electrical resistance value of the current limiter 180 in its diversion state may be of at least 50 Ohm, even at least 100 Ohm, even at least 200 Ohm, even at least 500 Ohm. The current limiter 180 is then, relative to the cut-off device 10 in which it is integrated, in a diversion state. Indeed, due to the resistance it opposes to the passage of the current, part of the current will then be diverted to the primary surge protector 30.

It can be provided that the current limiter switches from its on-state to its diversion state passively. It will be provided in this case that the threshold intensity of the current limiter 180 is calibrated to correspond to the intensity from which the cut-off device 10 is desired to operate.

It can be provided that the current limiter switches from its on-state to its diversion state in an active manner. Indeed, with some current limiters, it is possible to influence the value of the threshold intensity. For example, in the case of a current limiter 180 of the SCFCL superconducting type, it is possible to vary the value of the threshold intensity by modifying the temperature at which the superconducting material is maintained. It is also possible to vary the value of the threshold intensity by applying a magnetic field to the superconducting material. In this case, it is possible to control the switching of the current limiter from its on-state to its diversion state.

It will also be noted that the primary diversion member may comprise, electrically in series in the main line 16 between the primary point 12 and the intermediate point 13, a current limiter 180 and a switch, in particular a mechanical switch.

In order to allow the cut-off for low currents, additional systems (not represented) can be used to force the transition of the current limiter while the current passing therethrough is smaller than the threshold intensity. These systems are known to those skilled in the art. An example is given in document EP0384346. Other methods are possible, which for example provide for injecting, on command, additional current into the current limiter.

It will be noted that the cut-off device 10 according to the invention can be associated, in the electrical installation, electrically in series with another cut-off device, for example of the disconnector type, able to completely and reliably interrupt a residual current in the line. The order of magnitude of the residual current can indeed be of the order of 10 Amperes. This other cut-off device can be dimensioned to optimize its isolation power, without having to optimize its current interrupting capacity since this function will be primarily ensured by the cut-off device according to the invention.

It should also be noted that the cut-off device according to the invention is a bidirectional device, able to interrupt a current flowing through the device regardless of its direction of flow, therefore in both directions through the device. Therefore, such a cut-off device can be implemented in an installation including a mesh network, in a line in which the DC current can flow, depending on the configuration of the network at a given time point, in one direction or another.

A device according to the invention therefore allows ensuring swift and sure electrical opening, in order to stop the flow of a high-intensity fault current (in particular more than 10 kA), under a high voltage, in particular under a "High voltage B", in particular greater than 100 kV. However, once the device is open, it is necessary to be able to electrically reclose the cut-off device 10 to allow the restoration of the current if it is assumed that the origin of the fault has been solved. In this case, the device 10 is piloted for example by an electronic control unit so as to mechanically close the secondary switch 24 and, where appropriate for the embodiments including one, the primary switch 18, preferably successively and in this order, therefore by mechanically closing the secondary switch 24 before the primary switch 18.

Upon closure of the secondary switch 24, it can be determined one or more parameters of the current through the cut-off device 10 and/or of the phase to ground voltage, or in the installation, in particular to verify that the fault has been eliminated. This determination can be made by sensors placed in the installation or in the device 10, which can be linked to an electronic control unit of the device 10. However, it is possible that the fault has not been eliminated. Thus, depending on the parameters detected for the current through the device and/or the phase to ground voltage, it is possible to cause immediate reopening of the device without waiting for the reclosing of the primary switch 18 which would constitute a complete reclosing of the device 10.

It has been seen above that, to ensure the effective electrical cut-off in the primary switch 18, different auxiliary oscillation circuits 40 could be used. To do so, it is proposed to implement an auxiliary oscillation circuit 40 as illustrated in FIGS. 1 to 5, and as described above. Indeed, thanks to such a device, it is possible to insert, as desired, in a pilotable manner, and possibly temporarily, the damping resistance 48 in the oscillation loop formed by the auxiliary oscillation circuit 40 and the main line 16 portion which includes the primary switch 18. Thus, without changing the auxiliary oscillation capacitance 44, nor its initial charge level, and without changing the auxiliary inductance 42, it becomes possible, at a lower cost, to modify the auxiliary oscillation current which is injected into the auxiliary oscillation loop by the auxiliary oscillation circuit 40. The presence of the bypass switch 50 allows, instantly, transforming the auxiliary oscillation circuit 40 from a series RLC circuit to a series LC circuit, or vice versa. In other embodiments, the presence of the bypass switch 50 associated with a damping resistance 48 allows, instantly, transforming the auxiliary oscillation circuit 40 from one series RLC circuit into another series RLC circuit with a different total electrical resistance value.

Thus, depending on the fault current flowing in the main line 16, it is possible, with a view to ensuring the effective electrical cut-off in the primary switch 18, to inject into the oscillation loop, a resulting oscillation current either from the discharge of a series RLC circuit, or from the discharge of a series LC circuit, or from the discharge of another series RLC circuit with a different total electrical resistance value.

In this way, a method for piloting a cut-off device 10 including an auxiliary oscillation circuit 40 as illustrated in FIGS. 1 to 5 can be provided, including, at a given time point, the determination of at least one parameter of a current to be cut off through the device, for example the determination of an intensity value of this current. This determination can be direct, for example by the presence of a current intensity sensor in the main line portion 16 which includes the primary switch 18. This determination can be indirect, for example by analysis of other parameters of the cut-off device or of the installation. This determination can combine both a direct determination and an indirect determination. This determination can be made before the start of the process of opening the cut-off device, in particular before any mechanical opening of the primary switch 18. This determination can be made after the start of the process of opening the cut-off device, in particular after the mechanical opening of the primary switch 18. Of course, it is also possible to take into account, for this determination, parameters determined before and after the start of the process of opening the cut-off device 10.

Based on this determination, for example depending on the determined fault current intensity value, the piloting method can determine the state in which the bypass switch 50 must be switched.

In one example, it is considered that the oscillation circuit 40 is activated by the closing of the oscillation trigger 46 at a primary time point. At this time point, and in the immediately following time points, the current ISO through the bypass switch 50 remains at zero, which indicates the open state of the bypass switch 50 up to a secondary time point. Thus, between these two time points, the damping resistance 48 is effectively inserted into the auxiliary oscillation circuit 40, which is then a series RLC circuit. Thus, the start of the discharge of the oscillation capacitance 44 corresponds to the discharge of a series RLC circuit. From the secondary time point, the bypass switch 50 is switched to its closed state, so as to short-circuit the damping resistance 48. Thus, the continuation of the discharge of the oscillation capacitance 44 corresponds to the discharge of a series LC circuit.

Of course, it is possible to determine the duration of a time interval between the primary and secondary time points, time interval during which the damping resistance 48 is actually inserted in the auxiliary oscillation circuit 40. This duration can be predetermined, or it can be determined based on some parameters of the electric current in the device, in particular based on parameters of the fault current through the primary switch 18.

Thus, the cut-off device 10 including an oscillation circuit 40 can be piloted, for example by an electronic control unit, such that, when the trigger switch 46 is closed, the damping resistance 48 is inserted in the auxiliary oscillation circuit 40, or on the contrary short-circuited relative to this circuit. When the damping resistance 48 is inserted in the auxiliary oscillation circuit 40, it allows in particular limiting the rate of variation of the intensity d(I18)/dt of the current generated by the auxiliary oscillation circuit 40 in the primary switch 18 to the start of the discharge of the oscillation capacitance 44. In cases where the damping resistance 48 is actually inserted in the oscillation circuit when the trigger switch 46 is closed, it can be chosen to be short-circuited after a certain time interval, including before the electrical cut-off is effective in the primary switch 18, or on the contrary chosen to be kept inserted in the oscillation circuit for the whole duration of activation of the auxiliary oscillation circuit 40.

For a device as illustrated in FIG. 1, an optimal relationship has been determined between the characteristic parameters of the oscillation circuit $$d1t = \ln\left(\frac{V44i^2 * C44}{Idef^2 * L42 + \left(\frac{DI18}{dt}\right)\max^2 * L42^2 * C44}\right) * \frac{L42}{R48} \quad \text{[Math. 1]}$$

with
- d1t: Time interval during which the damping resistance 48 is actually inserted in the auxiliary oscillation circuit 40;
- (dI18/dt) max: Maximum value of dI18/dt at zero crossing of the current in the primary switch 18 for which the primary switch 18 can, on its own, ensure an electrical cut-off;
- V44i: Initial voltage across capacitance 44 of the oscillation circuit;
- Idef: Amplitude of the current to be cut off through the device 10;
- R48: Electrical resistance value of the damping resistance 48;
- C44: Capacitance value of the capacitance 44 of the auxiliary oscillation circuit 40;
- L42: Inductance value of the inductance 42 of the auxiliary oscillation circuit 40.

In any case, it is seen that the electrical resistance value of the damping resistance 48 does not need to be large. Therefore, the component(s) forming the damping resistance(s) can be compact and inexpensive. In addition, thanks to this low resistance value, the voltage value imposed on the bypass switch 50 associated with the resistance is also relatively low, therefore the component(s) forming the bypass switch(es) 50 can be compact and inexpensive.

In a device 10 according to the invention, the different elements which are susceptible to be controlled, such as for example the primary 18, secondary 24 switches, the main oscillation switch 36, and/or the current limiter 180 are for example controlled by an electronic control unit. The device 10 can thus include or be associated with one or more electronic control units. An electronic control unit typically comprises at least one processor and at least one electronic memory, and can comprise or be linked to one or more electronic communication circuits, for example for communication with one or several computer networks, and/or one or more electronic interface circuits, and/or one or more electronic input/output circuits. An electronic control unit can comprise or be associated with one or more displays. An electronic control unit can comprise or be associated with one or more sensors, for example one or more intensity sensors and/or one or more voltage sensors, configured to measure a value of a physical parameter in the cut-off device 10 or in the electrical installation in which the device 10 is intended to be integrated. The electronic control unit(s) is/are programmed to implement all or part of a method for opening the device as described above.

The invention claimed is:

1. A current cut-off device for high-voltage DC current, of the type including:
   - a main line between a primary point and a secondary point, with an intermediate point in the main line between the primary point and the secondary point;
   - a primary diversion member interposed in the main line between the primary point and the intermediate point, the primary diversion member having at least an on-state, in which it conducts an electric current between the primary point and the intermediate point, and at least a diversion state, in which it opposes at least partly a passage of an electric current between the primary point and the intermediate point;
   - a primary surge protector electrically arranged in parallel with the primary diversion member, between the primary point and the intermediate point;
   - a secondary switch interposed in the main line between the intermediate point and the secondary point, the secondary switch having an open state and a closed state;
   - a main resonator including at least a main inductance and a main capacitance electrically in series between a first terminal and a second terminal of the main resonator, the second terminal being electrically linked to the secondary point of the main line;
   - a main oscillation switch;
   - a main surge protector, electrically arranged in parallel at least with the main capacitance of the main resonator;
   - wherein the main oscillation switch includes a three-terminal changeover switch comprising:
   - a direct terminal electrically linked to the primary point of the main line;
   - an inverting terminal electrically linked to the intermediate point of the main line;
   - an output terminal electrically linked to the first terminal of the main resonator;
   - and able to switch at least between the three following states:
   - a direct state in which the output terminal is only linked to the direct terminal;
   - an inverting state in which the output terminal is only linked to the inverting terminal; and
   - an isolated state in which the output terminal is electrically isolated from the direct terminal and from the inverting terminal.

2. The cut-off device according to claim 1, wherein the three-terminal changeover switch includes a direct switch between the direct terminal and the output terminal and a reversing switch between the inverting terminal and the output terminal, with at only one of the two direct and reversing switches which is in a closed state at a given time.

3. The cut-off device according to claim 2, wherein the direct switch and the reversing switch are bidirectional switches.

4. The cut-off device according to claim 2, wherein each of the direct switch and/or of the reversing switch includes two thyristors mounted head-to-tail, each in one of two branches electrically in parallel.

5. The cut-off device according to claim 1, wherein the primary diversion member is a switch, called primary switch, the on-state corresponding to a closed state of the primary switch and the diversion state corresponding to an open state of the primary switch.

6. The cut-off device according to claim 5, wherein it includes an auxiliary oscillation circuit arranged electrically in parallel with the primary switch between the primary point and the intermediate point, the auxiliary oscillation circuit including at least an auxiliary inductance, an auxiliary capacitance and an auxiliary oscillation trigger electrically in series.

7. The cut-off device according to claim 6, wherein it includes, in the auxiliary oscillation circuit, a pilotable device allowing varying a resistance value inserted in series in the auxiliary oscillation circuit.

8. The cut-off device according to claim 1, wherein the primary diversion member comprises a current limiter.

9. The cut-off device according to claim 8, wherein the current limiter is of a superconducting resistance type.

10. A method for piloting a cut-off device according to claim 1, wherein it includes the steps of:
switching the primary diversion member to its diversion state;
mechanically opening the secondary switch;
repeatedly switching the three-terminal changeover switch between its direct and inverting states, by passing at each alternation through the isolated state.

11. The method for piloting a cut-off device according to claim 10, wherein the three-terminal changeover switch is switched at a frequency of changeover cycles adapted to a resonant frequency of the main resonator.

12. The method for piloting a cut-off device according to claim 10, wherein the switching of the three-terminal changeover switch is stopped as soon as the current in the secondary switch is zero or the voltage across the primary surge protector is zero.

13. The method for piloting a cut-off device according to claim 10, wherein it includes the step of cutting off the current in the primary diversion member designed as a mechanical primary switch, after its mechanical opening, to cause an appearance, across the primary surge protector, of a voltage greater than a transition voltage of the primary surge protector.

14. The cut-off device according to claim 1, wherein the three-terminal changeover switch is bidirectional.

15. The cut-off device according to claim 1, wherein the three-terminal changeover switch is an electronic semiconductor changeover switch.

16. The cut-off device according to claim 5, wherein the primary switch and the secondary switch are interposed successively in the main line between the primary point and the secondary point, on either side of the intermediate point of the main line, and each able to be independently controlled between their open state and their closed state.

17. The cut-off device according to claim 5, wherein the primary switch is a "high voltage A" switch, and the secondary switch is a "high voltage B" switch.

18. The cut-off device according to claim 5, wherein the primary switch is a vacuum switch, and the secondary switch is an isolating gas switch.

19. The cut-off device according to claim 1, wherein the primary diversion member is a current limiter.

20. The cut-off device according to claim 1, wherein it includes a surge protector electrically arranged between the primary point and the first terminal of the main resonator or between the intermediate point and the first terminal of the main resonator.

* * * * *